US007415506B2

(12) United States Patent
Gajjar et al.

(10) Patent No.: US 7,415,506 B2
(45) Date of Patent: Aug. 19, 2008

(54) STORAGE VIRTUALIZATION AND STORAGE MANAGEMENT TO PROVIDE HIGHER LEVEL STORAGE SERVICES

(75) Inventors: Kumar Gajjar, San Jose, CA (US); Jim Collins, Nashua, NH (US); Dipam Patel, Fremont, CA (US); Richard Meyer, San Francisco, CA (US); Chandra Prasad, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 634 days.

(21) Appl. No.: 10/076,855

(22) Filed: Feb. 13, 2002

(65) Prior Publication Data

US 2002/0156987 A1    Oct. 24, 2002

Related U.S. Application Data

(60) Provisional application No. 60/268,694, filed on Feb. 13, 2001.

(51) Int. Cl.
*G06F 15/16* (2006.01)
*G06F 12/00* (2006.01)
*G06F 13/00* (2006.01)
*G06F 9/26* (2006.01)

(52) U.S. Cl. .................... 709/215; 709/212; 711/114; 711/202

(58) Field of Classification Search ................. 709/219, 709/212, 215; 710/9; 711/112, 202, 114
See application file for complete search history.

(56) References Cited

U.S. PATENT DOCUMENTS

| 4,916,608 | A |   | 4/1990  | Shultz          |         |
|-----------|---|---|---------|-----------------|---------|
| 5,325,505 | A |   | 6/1994  | Hoffecker et al.|         |
| 5,568,629 | A | * | 10/1996 | Gentry et al.   | 711/114 |
| 5,704,032 | A |   | 12/1997 | Badovinatz et al.|        |
| 5,742,792 | A |   | 4/1998  | Yanai et al.    |         |
| 5,790,773 | A |   | 8/1998  | DeKoning et al. |         |
| 5,897,661 | A |   | 4/1999  | Baranovsky et al.|        |

(Continued)

FOREIGN PATENT DOCUMENTS

WO    WO 02/05185 A1    1/2002

OTHER PUBLICATIONS

Mayez A. Al-Mouhamed et al., "A Heuristic Storage for Minimizing Access Time of Arbitrary Data Patterns", IEEE Transactions on Parallel and Distributed Systems, Apr. 1997, pp. 441-447, vol. 8, No. 4.

(Continued)

*Primary Examiner*—Jason Cardone
*Assistant Examiner*—Brian J Gillis
(74) *Attorney, Agent, or Firm*—Leland Wiesner; Wiesner & Associates

(57) ABSTRACT

In a storage server on a storage area network, a media unit manager manages disk space in a manner transparent to the host computers. The media unit manager uses media units corresponding to the physical storage devices on the storage area network to build higher-level media units. The higher level media units can have the attributes of being sliced, concatenated, mirrored, striped, etc. Thus, the host computers need not be aware of the specific physical storage devices themselves, reducing the management and reconfiguration burden on the host computers when storage devices are added to or removed from the storage area network.

41 Claims, 24 Drawing Sheets

U.S. PATENT DOCUMENTS

| | | | |
|---|---|---|---|
| 5,960,451 | A | 9/1999 | Voigt et al. |
| 5,996,086 | A | 11/1999 | Delaney et al. |
| 6,104,871 | A | 8/2000 | Badovinatz et al. |
| 6,145,028 | A | 11/2000 | Shank et al. |
| 6,173,377 | B1 | 1/2001 | Yanai et al. |
| 6,175,904 | B1 | 1/2001 | Gunderson |
| 6,185,695 | B1 | 2/2001 | Murphy et al. |
| 6,202,157 | B1 | 3/2001 | Brownlie et al. |
| 6,247,077 | B1 | 6/2001 | Muller et al. |
| 6,275,898 | B1 * | 8/2001 | DeKoning ............... 711/114 |
| 6,289,376 | B1 | 9/2001 | Taylor et al. |
| 6,295,575 | B1 | 9/2001 | Blumenau et al. |
| 6,332,177 | B1 | 12/2001 | Humlicek |
| 6,526,478 | B1 | 2/2003 | Kirby |
| 6,567,889 | B1 | 5/2003 | DeKoning et al. |
| 6,571,354 | B1 | 5/2003 | Parks et al. |
| 6,594,745 | B2 * | 7/2003 | Grover ............... 711/162 |
| 6,598,174 | B1 | 7/2003 | Parks et al. |
| 6,609,213 | B1 | 8/2003 | Nguyen et al. |
| 6,618,798 | B1 * | 9/2003 | Burton et al. ............... 711/202 |
| 6,625,650 | B2 | 9/2003 | Stelliga |
| 6,625,747 | B1 | 9/2003 | Tawil et al. |
| 6,629,264 | B1 | 9/2003 | Sicola et al. |
| 6,636,239 | B1 | 10/2003 | Arquie et al. |
| 6,651,154 | B1 * | 11/2003 | Burton et al. ............... 711/202 |
| 6,658,590 | B1 | 12/2003 | Sicola et al. |
| 6,671,776 | B1 * | 12/2003 | DeKoning ............... 711/114 |
| 6,691,244 | B1 | 2/2004 | Kampe et al. |
| 6,714,952 | B2 | 3/2004 | Dunham et al. |
| 6,742,034 | B1 * | 5/2004 | Schubert et al. ............ 709/226 |
| 6,769,071 | B1 | 7/2004 | Cheng et al. |
| 6,775,230 | B1 | 8/2004 | Watanabe et al. |
| 6,801,992 | B2 | 10/2004 | Gajjar et al. |
| 6,804,819 | B1 * | 10/2004 | Bates et al. ............... 719/318 |
| 6,810,396 | B1 * | 10/2004 | Blumenau et al. ............... 707/5 |
| 6,813,686 | B1 * | 11/2004 | Black ............... 711/114 |
| 6,880,062 | B1 | 4/2005 | Ibrahim et al. |
| 6,977,927 | B1 * | 12/2005 | Bates et al. ............... 370/381 |
| 2001/0049779 | A1 | 12/2001 | Shimada et al. |
| 2002/0007468 | A1 | 1/2002 | Kampe et al. |
| 2002/0019958 | A1 | 2/2002 | Cantwell et al. |
| 2002/0026558 | A1 | 2/2002 | Reuter et al. |
| 2002/0029319 | A1 | 3/2002 | Robbins et al. |
| 2002/0053009 | A1 | 5/2002 | Selkirk et al. |
| 2002/0073257 | A1 | 6/2002 | Beukema et al. |
| 2002/0112113 | A1 | 8/2002 | Karpoff et al. |
| 2002/0128815 | A1 * | 9/2002 | Merchant et al. ............... 704/2 |
| 2002/0188711 | A1 | 12/2002 | Meyer et al. |
| 2003/0236945 | A1 | 12/2003 | Nahum |
| 2005/0027754 | A1 | 2/2005 | Gajjar et al. |

OTHER PUBLICATIONS

Chris Mercier et al., "SNIA White Paper, Discovery in the SAN Definition and Terminology", Jun. 2000, pp. 1-16, Version 1.1, SNIA Discovery Working Group.

Fred B. Schneider, "Implementing Fault-Tolerant Services Using the State Machine Approach: A Tutorial", Dec. 1990, 1 page (abstract), vol. 22, No. 4, ACM Computing Surveys.

Jang Sun Lee et al., "Logical Disks: User-Controllable I/O for Scientific Applications", 1996, pp. 340-347, IEEE.

M. Pease et al., "Reaching Agreement in the Presence of Faults", Journal of the Association for Computing Machinery, Apr. 1980, 1 page (abstract), vol. 27, No. 2, ACM.

Leslie Lamport et al., "The Byzantine Generals Problem", ACM Transactions on Programming Languages and Systems, Jul. 1982, 1 page (abstract), vol. 4, No. 3, ACM.

Robert M. Montague et al., "Virtualizing the San", Morgan Keegan & Company, Inc., Jul. 5, 2000, pp. 1-20.

* cited by examiner

STORAGE VIRTUALIZATION AND STORAGE MANAGEMENT TO PROVIDE HIGHER LEVEL STORAGE SERVICES

CROSS-REFERENCES TO RELATED APPLICATIONS

This application claims priority to U.S. Provisional Application No. 60/268,694, filed Feb. 13, 2001 and titled "Virtual Storage Systems", which is incorporated herein by reference.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates to storage area networks and network attached storage. In particular, the present invention relates to a storage server that uses blocks of storage address space to virtualize different types of storage.

Storage virtualization describes the process of representing, to a user, a number of discrete physical storage devices as a single storage pool having a single set of characteristics. For example, in a storage area network connecting host computers with storage devices, the user perceives a single block of disk space with a defined reliability (e.g., 100 GB at RAID1); however, the user's host computer is configured to access the storage devices such that 100 GB at RAID1 is provided, regardless of whether the data is stored on a single RAID1 disk array or is split across multiple, separate disks.

In the above situation, each host computer must be aware of the storage devices connected to the storage area network because each host computer manages the storage virtualization that is presented to its users. When the storage devices connected to the storage area network are modified (such as a new device being added or an existing device being removed), each host computer must be reconfigured to accommodate the modification. Such reconfiguration involves work by network administrators and ensures that changes in the network are not seamless.

The present invention is directed toward improvements in this and other areas.

BRIEF SUMMARY OF THE INVENTION

In order to provide improvements in storage area networking, the present invention uses "media units" to represent storage space and builds additional media units from existing media units. For example, the lowest level media units are physical media units. Higher-level media units can then be built from the physical media units. Examples of such higher-level media units include slice media units, concatenation media units, striped media units (also called RAID0 media units), and mirrored media units (also called RAID1 media units). Such higher-level media units can also be built from other higher-level media units. This greatly improves management of the storage area network from a host computer perspective.

In accordance with one embodiment of the present invention, a storage server connects host computers and storage devices in a storage area network. The storage devices have associated therewith physical logical unit numbers (PLUNs). The storage server includes a processor that executes processing. The processing includes mapping the PLUNs to first media units; creating a second media unit from the first media units; and managing access, using the second media unit, to the storage devices by the host computers.

The details of the embodiments of the present invention can be seen in the following drawings and detailed description.

DETAILED DESCRIPTION OF THE INVENTION

Figure 1:
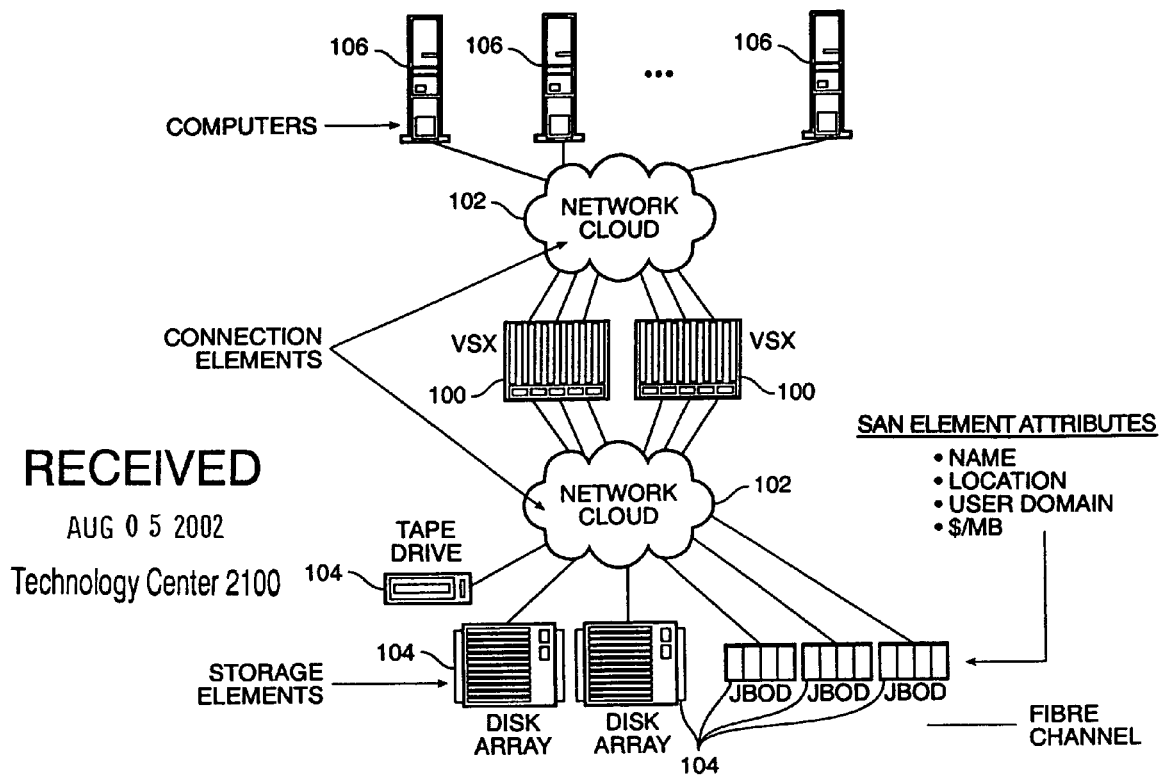
FIG. 1 is a block diagram of a storage area network including a storage server according to an embodiment of the present invention.

FIG. 1 shows a storage server 100 according to an embodiment of the present invention. The figure also shows a storage area network (SAN) 102, a number of physical storage devices 104, and a number of host computers 106. The storage server 100 is also referred to as a Virtual Storage Exchange (VSX) and is further detailed in FIGS. 2A-2B.

The SAN 102 can be any type of computer network. It is referred to as a storage area network in the present application because that is its relevant function with respect to the embodiments of the present invention. In an embodiment of the present invention, the SAN 102 is a Fibre Channel network, the host computers 106 and the storage devices 102 are configured to communicate with a Fibre Channel network, and the storage server 100 is also configured to communicate with a Fibre Channel network. Thus, the storage server 100 can be easily added to an existing SAN.

The physical storage devices 104 include tape drives, disk arrays, JBODs ("just a bunch of disks"), or other types of data storage devices. The physical storage devices 104 can be connected directly to the host computers 106 via the SAN 102 or can be indirectly connected to the host computers 106 via the SAN 102 and the storage server 100. As discussed above in the Background, management of storage virtualization is burdensome when the storage devices 104 are directly connected to the host computers 106 via the SAN 102. The present invention improves management of storage virtualization by using the storage server 100 to indirectly connect the storage devices 104 to the host computers 106.

The host computers 106 can be servers or stand-alone computers. The host computers 106 can be directly connected to the SAN 102 or indirectly connected via a switch, router, or other communication link.

Figure 2A:
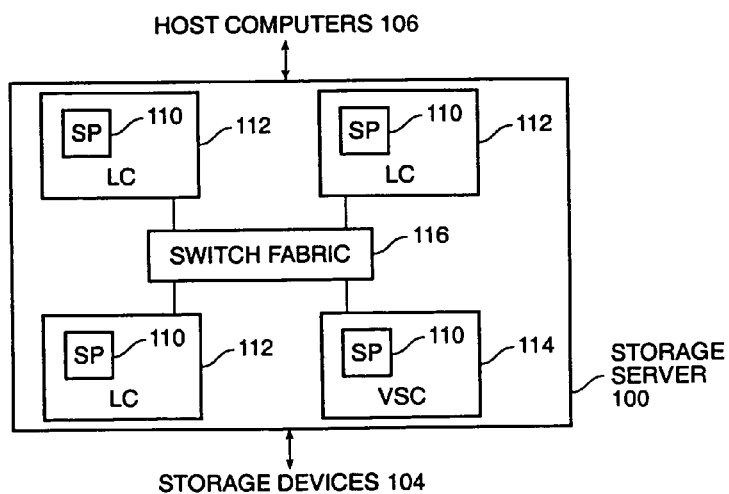
FIG. 2A is a block diagram of hardware components in the storage server according to an embodiment of the present invention.

FIG. 2A is a block diagram of the storage server 100 showing the hardware components related to embodiments of the present invention, including a storage processor 110, a line card 112, a virtual server card 114, and a switch fabric 116.

The storage server 100 may include one or more storage processors 110. The storage processors 110 process the storage commands and data to be stored as information flows between the host computers 106 and the storage devices 104. One or more of the storage processors 110 may be included on each line card 112. The storage server 100 includes space for numerous line cards 112, so the capabilities of the storage server 100 can be modularly increased by adding more line cards 112 or more storage processors 110. Each storage processor 110 is associated with one or more ports of the storage server 100.

The storage server 100 may include one or more virtual server cards 114. The virtual server cards control the operation of the storage server 100 and control the line cards 112, which perform the actual work of transferring commands and data.

The switch fabric 116 connects the storage processors 110. The switch fabric switches information received at one port to another port of the storage server 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 116. Then the switch fabric 116 transfers the data read from the storage device to the host computer 106, via the downstream and upstream storage processors 110.

Figure 2B:
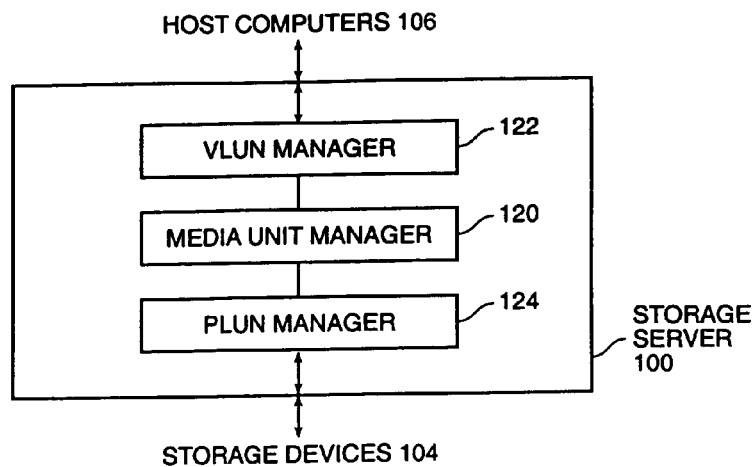
FIG. 2B is a block diagram of management functions in the storage server according to an embodiment of the present invention.

FIG. 2B is a block diagram of the storage server 100 showing the functionality relevant to embodiments of the present invention. The functions of the storage server 100 may be implemented by one or more processors that execute processing according to one or more computer programs, microcode segments, hardware structures, or combinations thereof. The functions relevant to the present invention are the media unit (MU) manager 120, the virtual logical unit number (virtual LUN or VLUN) manager 122, and the physical logical unit number (physical LUN or PLUN) manager 124. Additional details of the storage server 100 are provided in the following other applications assigned to the present assignee and filed on Feb. 13, 2002 that claim the benefit from the above-noted Provisional Application No. 60/268,694 and are hereby incorporated herein by reference: U.S. patent application Ser. No. 10/077,696 titled "Silicon Based Storage Virtualization Server", U.S. patent application Ser. No. 10/076,909 titled "Method and Apparatus for Identifying Storage Devices", U.S. patent application Ser. No. 10/077,482 titled "System and Method for Policy Based Storage Provisioning and Management", U.S. patent application Ser. No. 10/077,181 titled "Virtual Data Center", 10/076,906 titled "Failover Processing in a Storage System", U.S. patent application Ser. No. 10/077,199 titled "RAID at Wire Speed", and U.S. patent application Ser. No. 10/076,878 titled "Method for Device Security in a Heterogeneous Storage Network Environment".

The PLUN manager 124 manages data and command transfer to and from the storage devices 104. Each storage device 104 may have associated therewith a PLUN that is used for identifying each particular storage device 104.

The VLUN manager 122 manages data and command transfer to and from the host computers 106. Each host computer 106 may be associated with one or more VLUNs. Each VLUN represents a virtual address space (e.g., gigabytes of storage) with defined attributes (e.g., performance parameters, reliability level, etc.). As such, each host computer 106 exchanges data and commands with the storage server 100 with reference to a particular VLUN.

The MU manager 120 basically translates between VLUNs and PLUNs. The MU manager 120 is responsible for managing the address space of all the storage devices 104 (physical LUNs) connected to the storage server 100. The MU manager 120 also manages the address space of the storage constructs built within the storage server 100, including slices, concatenations, RAID0 (stripes) and RAID1 (mirrors).

The MU manager 120 uses an abstract block-storage addressing technique that enables address spaces to be treated in a logical manner, regardless of the underlying storage constructs or physical LUNs. These logical address spaces can be combined together into more complex and feature rich storage constructs, which are also treated simply as abstract block-storage address spaces.

Used in conjunction with a virtual LUN, these logical address spaces can be configured to appear as LUNs on a multi-ported storage device. This process of presenting physical LUNs as logical address spaces on virtual devices is referred to as storage virtualization.

Abstract block-storage addressing is achieved via a data structure known as a media unit (MU). The various types of media units are described throughout this document.

Figure 3A:
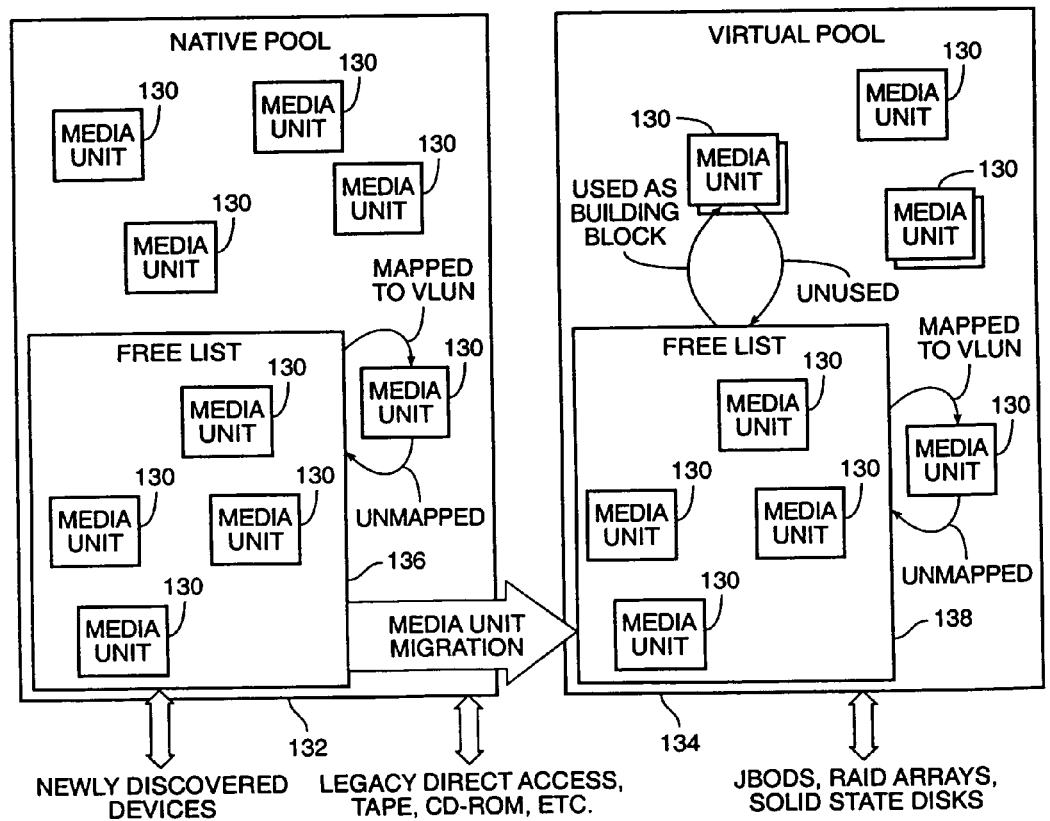
FIG. 3A is a diagram of a native pool and a virtual pool according to an embodiment of the present invention.

FIG. 3A is a block diagram showing that the media unit manager 120, in one embodiment of the invention, maintains two major pools of media units 130: the native pool 132 and the virtual pool 134.

The native pool 132 contains legacy direct access devices with existing user data and devices such as tape, CD-ROM, SES, etc. These media units 130 are preferably virtualized "as is" by the media unit manager 120. In other words, the media unit manager 120 preferably does not alter the content or the attributes of the underlying address space. A media unit 130 in the native pool 132 preferably represents an entire physical LUN.

A newly discovered physical LUN is preferably added to the free list 136 of the native pool 132. A media unit 130 in the native pool 132 can be exported to a host using a VLUN. It preferably cannot be used as a building block for other media units 130. Direct access media units 130 in the native pool 132 can be migrated to the virtual pool 134.

The native pool 132 preferably obeys the following rules:
1. A media unit 130 created for a newly discovered PLUN is preferably added to the native pool 132;
2. Media units 130 in the native pool are preferably virtualized "as is"; and
3. The native pool 132 preferably contains media units for all the devices that (a) are not direct access devices, such as tape, CD-ROM, SES, etc., and (2) are direct access devices that contain existing user data.

Direct access media units 130 in the native pool 132 that are not currently mapped to a VLUN can be migrated to the free list 138 in the virtual pool 134. Thus, the virtual pool 132 preferably only contains media units 130 representing direct access devices. Once in the virtual pool 134, these media units 130 can be exported to a host 106 using a VLUN or they can be used as building blocks to create other types of media units.

For example, the media unit manager 120 can use two media units in the virtual pool 134, each of logical address space of size X, to create a mirrored media unit (RAID1 media unit) with logical address space of size X.

The Virtual Pool preferably obeys the following rules:
1. The maximum number of media units in the system is unlimited;
2. Media unit properties can be changed;
3. The starting and ending address of any media unit is preferably modulo 2 so that it can be calculated by shifting the address;
4. A media unit for a PLUN is migrated to the Virtual Pool preferably only if instructed by the administrator;
5. A media unit for a PLUN preferably can only be in one of the virtual pool 134 or the native pool 132, but not both; and
6. The virtual pool 134 preferably can only contain direct access devices.

In one embodiment of the present invention, bookkeeping information may be written to media units in the virtual pool 134 to facilitate identification; for example, when a media unit is moved. If meta-data is maintained on the media unit, a newly-discovered media unit may be placed directly into the virtual pool 134.

The media unit manager 120 uses media units 130 to represent the logical address space of a block storage device. Persistent information on media units 130 may be maintained within the database. In order to describe the functional characteristics of media units, the following attributes may be used:
1. Type: Identifies the kind of media unit and characteristics of the logical address space;
2. Usage State: Indicates the availability of the media unit;
3. Service State: Indicates the "online status" of the media unit;
4. Start LBA: The starting block of the logical address space (preferably 0);
5. Block Size: The size of a block in the logical address space; and
6. Block Count: The number of blocks in the logical address space.

Media units may also be characterized by a set of properties, where a property is simply a name/value pair. These properties are based upon 1) the characteristics of the underlying PLUNs, 2) the properties of any child media units used as building blocks, and 3) the type of the media unit itself. Media unit properties can be added, removed, and modified on the fly. Some example properties include:
1. Performance: Fast, medium, slow, etc.;
2. Connection Redundancy: Single path, multi-path, multi-storage server, etc.;
3. Data Redundancy: Non-redundant, local redundancy, remote Redundancy, etc.;
4. Location: An optional user-specified property; and
5. Account: The account that owns the media unit—may be aggregation or property.

The media unit manager 120 provides a core set of interfaces to build the various types of media units 130 and to control the native pool 132 and the virtual pools 134, among other functions. Advanced, wizard-like interfaces to create media units that fulfill a set of quality of service requirements may be used.

A typical user wishing to allocate a logical address space may simply specify one or more of these quality of service properties. The storage server 100 then queries the database for media units that meet those criteria. After some complex analysis, it creates the "best-fit" media unit using the core operations provided by the media unit manager 120. Advanced users that want complete control over the media units can bypass the wizard interfaces and access the operations of the media unit manager 120 directly.

The native pool 132 contains legacy direct access devices with existing user data. It also contains many other devices that are preferably virtualized "as is" to a host using a VLUN. All media units 130 in the native pool 132 are preferably of the physical media unit type.

A physical media unit is bound to a single physical LUN and preferably represents the entire address space of that physical LUN. The peripheral device type of the underlying PLUN indicates the type of the device, such as Direct Access, Sequential Access, Printer, Processor, Write Once, CD ROM, Scanner, Optical Memory, Medium Changer, Communications, ASCIT8, Storage Array Controller, Enclosure Services, Unknown, etc.

Preferably, only those physical media units with a PLUN peripheral device type of "Direct Access" are migrated from the native pool 132 to the virtual pool 134.

Figure 3B:
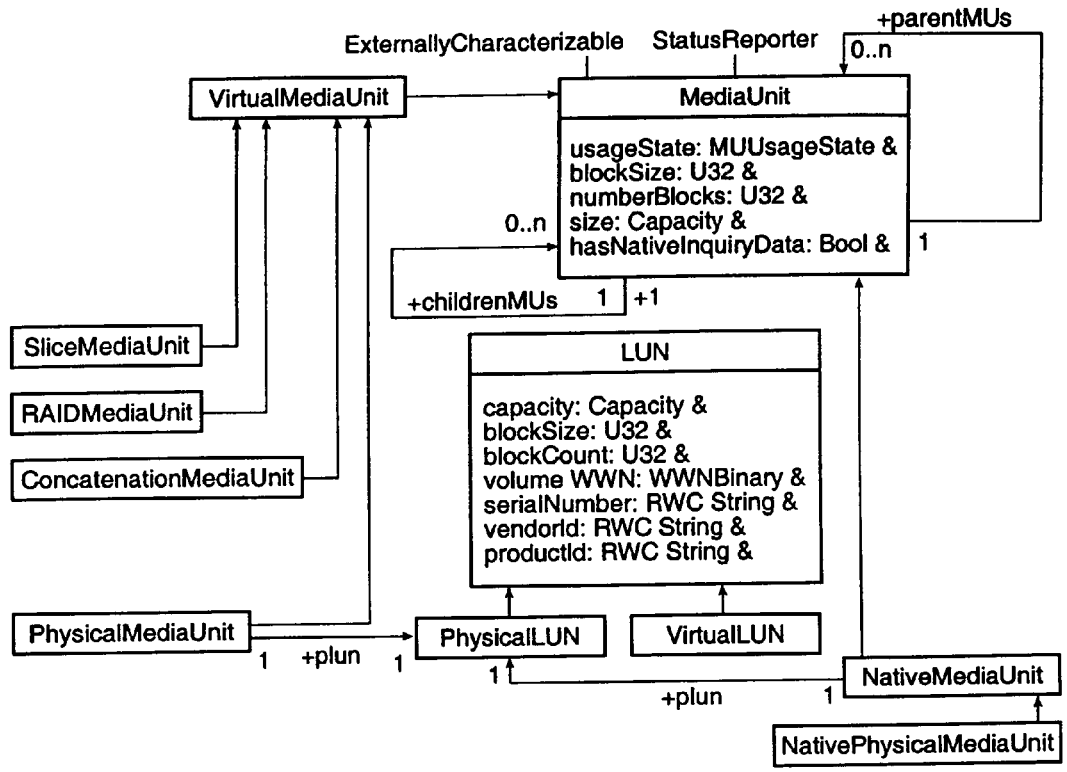
FIG. 3B is a data diagram showing various types of media units according to an embodiment of the present invention.

FIG. 3B is a data diagram showing the object model for the media units. The data diagram is depicted in the Unified Modeling Language, an industry standard way of representing object models. Information on the Unified Modeling Language can be found in the document "OMG Unified Modeling Language Specification" (Object Management Group), which is incorporated herein by reference. Copies of this document may be obtained online at the OMG website <omg.org>.

Figure 4A:
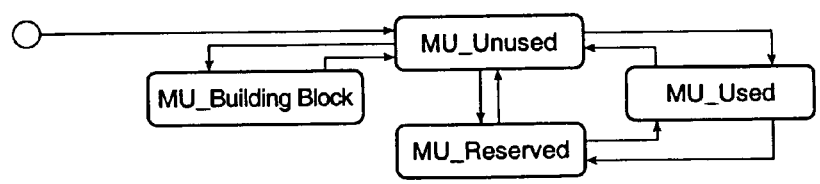
FIGS. 4A-4B are diagrams of usage states and service states of media units according to an embodiment of the present invention.
Figure 4B:

FIGS. 4A-4B show the usage states and service states of physical media units in the native pool 132 according to one embodiment of the present invention. Preferably all media units 130 in the native pool 132 share the same basic "pass-through" behavior from the point of view of the media unit manager 120. When a newly discovered PLUN is announced to the media unit manager 130, the media unit manager performs the following steps:

1. It creates a physical media unit and binds it to the underlying PLUN;
2. It sets the usage state to "Unused";
3. It sets the service state to "Online"; and
4. It adds the physical media unit to the free list 136 in the native pool 132.

When a physical media unit is exported to a host by mapping it to a VLUN using the virtual LUN manager 122, its usage state is set to "Used." It will preferably remain in that state until the media unit is unmapped from the VLUN.

If the physical LUN is deleted, the physical media unit (native or virtual, used or unused) will preferably have its state updated to Offline and Missing. The user can then choose to remove these media units manually. Should the PLUN be rediscovered on the same or a different port on the storage server 100, its corresponding physical media unit will preferably return to the "Online" state.

The migration of a direct access physical media unit from the native pool 132 to the virtual pool 134 is preferably only allowed when the physical media unit (of direct access type) is in the "Unused" state.

Similar diagrams may be used to illustrate common media unit usage states and service states in the virtual pool 134. The virtual pool 134 contains direct access media units 130 that can be (1) exported to a host by mapping the media unit to a VLUN, (2) used as building blocks to create other media units in the virtual pool, or (3) reserved for future use. The following types of media units 130 can be found in the virtual pool 134:

1. Physical media unit (whose PLUN peripheral device type is Direct Access);
2. Slice media unit;
3. Concatenation media unit;
4. Striped (RAID0) media unit; and
5. Mirrored (RAID1) media unit.

The sections that follow describe the different types of media units found in the virtual pool 134 along with their state behavior and characteristics.

The media units 130 in the virtual pool 134 share some common behavior. Each type of media unit then extends this behavior to achieve its specific responsibilities.

If a media unit 130 is exported to a host by mapping it to a VLUN or it is used as a building block for another media units, its usage state is set to "Used." It will remain in that state until the media unit is no longer mapped to a VLUN and it is not used as a building block for other media units, at which time it re-enters the "Unused" state.

A media unit 130 in the virtual pool 134 can enter the "Reserved" state to indicate that it is not available for general consumption as a building block, even though it has not yet been mapped to a VLUN. The "Reserved" state enables the user to create several media units in advance and map them to VLUNs at a later time.

The "Reserved" state can also be used by the services software to temporarily remove a VLUN mapping without exposing the media unit to general consumption as a building block.

Figure 5A:
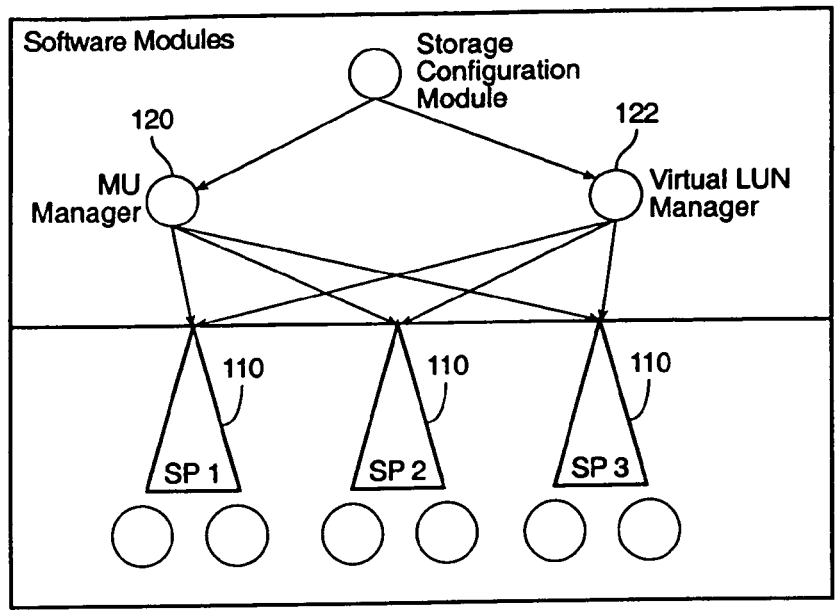
FIGS. 5A-5B are diagrams showing distributed processing by the media unit manager according to an embodiment of the present invention.
Figure 5B:
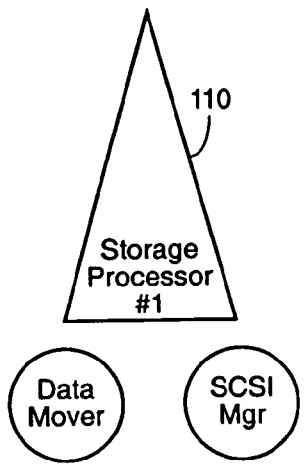

FIGS. 5A-5B are block diagrams showing the interaction between software modules and storage processors 110 in the storage server 100 according to one embodiment of the present invention. The MU manager 120 uses distributed software agents, such as the data mover, to perform the work for processes such as RAID reconstruction, RAID initialization, snapshot, etc. (all of which are further described in subsequent sections). These software agents run on different storage processors 110 than the MU manager 120. This allows the MU manager 120 to scale as more ports and physical LUNs are added to the system.

Figure 6:
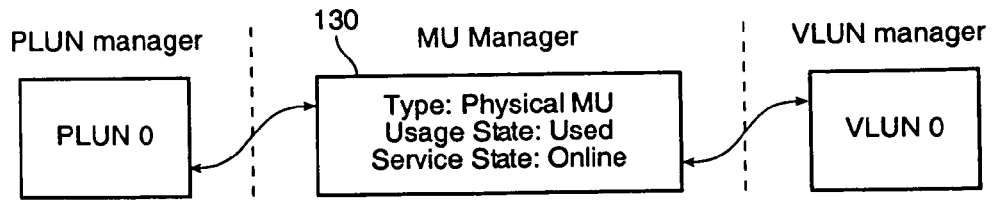
FIG. 6 is a diagram showing the relationship between PLUNs, media units and VLUNs according to an embodiment of the present invention.

FIG. 6 shows the relationship between physical media units and the other services. The PLUN manager 124 manages PLUNs, the MU manager 120 manages media units, and the VLUN manager 122 manages VLUNs. These relationships are further developed in following sections.

In addition, FIG. 6 shows the relationships between PLUNs, media units, and VLUNs. Generally, a PLUN directly corresponds to a storage device, such as a disk or a disk array. Such a direct one-to-one is relationship generally shown in the following figures. However, a PLUN can also be associated with a portion of the storage device. Multiple PLUNs can be associated with different portions of a single storage device.

Each physical media unit (first-level media unit) generally directly corresponds to a single, respective PLUN.

Each VLUN is generally associated with a single, respective media unit.

Figure 7:
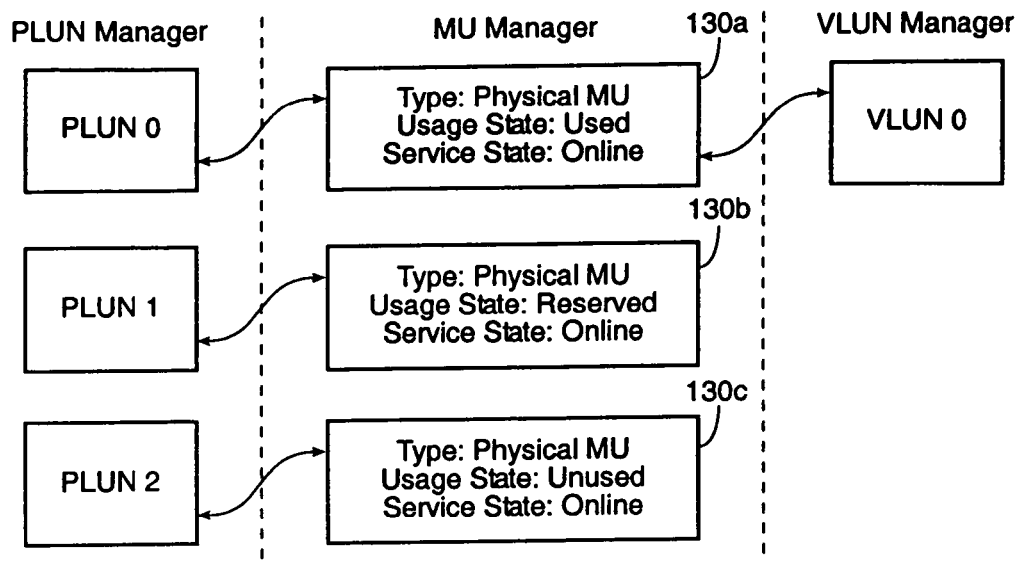
FIG. 7 is a diagram showing examples of usage states of media units according to an embodiment of the present invention.

FIG. 7 illustrates the usage states of physical media units. Preferably, only those physical media units with a PLUN peripheral device type of "Direct Access" can be migrated to the virtual pool 134. Preferably, the physical media unit represents the entire address space of a physical LUN (PLUN). In one embodiment, all physical media units are initially created in the native pool 132 to ensure that their existing user data is preserved. Prior to migrating a physical media unit to the virtual pool 134, its usage state should preferably be "Unused" and its service state should preferably be "Online."

Like all media units in the virtual pool 134, if a physical media unit is exported to a host by mapping it to a VLUN or it is used as a building block for other media units, its usage state is set to "Used." It will preferably remain in that state until the media unit is no longer mapped to a VLUN and it is not used as a building block for other media units.

In one embodiment of the invention, if the physical LUN is deleted and the physical media unit is in the "Unused" state, the corresponding physical media unit will also be deleted. If the physical media unit is in the "Used" state when the PLUN is deleted, the physical media unit will not be deleted, but its service state will enter the "Offline" state. Should the PLUN be rediscovered on the same or a different port of the storage server 100, its corresponding physical media unit will return to the "Online" state.

FIG. 7 shows three physical media units. The first physical media unit 130a has been exported to a host using a VLUN. The second physical media unit 130b has been placed into the "Reserved" state to prevent it from being automatically consumed by other media units. The third physical media unit 130c is in the "Unused" state and is available to be mapped to a host with a VLUN or to be used as a building block. Note that in the following sections, we will see physical media units used as building blocks to create other media units.

The service states of the physical media unit follow the common behavior for media units in the virtual pool 134.

Figure 8:
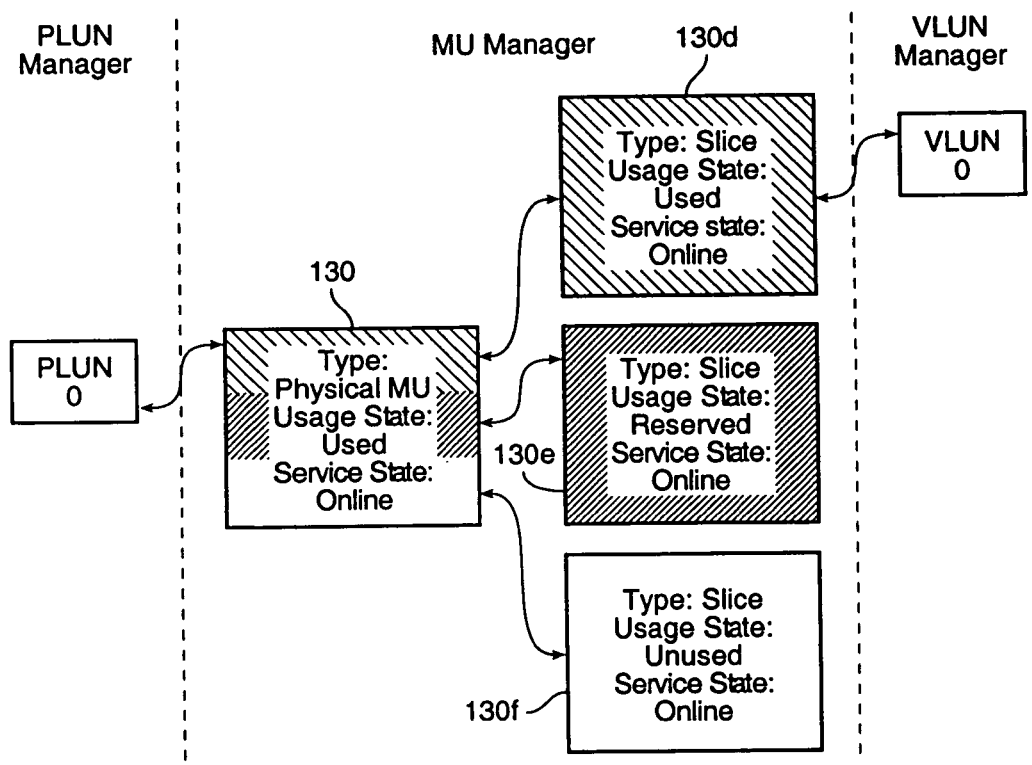
FIG. 8 is a diagram of exemplary slice media units according to an embodiment of the present invention.

FIG. 8 shows slice media units. A slice media unit represents a part of an address space of an existing media unit. When the user requests a media unit with certain characteristics of a size that is smaller than the media units with those characteristics, the media unit manager 120 allows an existing media unit to be sliced up. One slice media unit will be created to fulfill the request. The remainder of the address space of the media unit being sliced will be captured in a second slice media unit.

If a Slice Media Unit is in the "Unused" state, it can be:

1. Carved up into smaller, adjacent slice media units; and
2. Merged with adjacent slice media units that are also in the "Unused" state.

In one embodiment of the present invention, only a flat slicing model is supported. Hierarchies of slices are not allowed. In other words, in such an embodiment it is not legal for a slice media unit to have another slice media unit as a child. This requirement can be relaxed in other embodiments.

FIG. 8 shows a physical media unit 130 that has been carved up into three slice media units. The first slice media unit 130*d* has been exported to a host by mapping it to a VLUN. The second slice media unit 130*e* has been reserved for later use. The third slice media unit 130*f* is available to be used as a building block for other media units or to be exported to a host.

According to one embodiment of the present invention, once the physical media unit 130 in FIG. 8 has been sliced, it enters the "Used" state. That means the physical media unit cannot be directly used as a building block for any other media units and it cannot be mapped to a VLUN. If all of the slice media units tied to the physical media unit are deleted, then the physical media unit will once again enter the "Unused" state.

If in FIG. 8 the PLUN 0 went offline, that would result in the physical media unit 130 going offline, which, in turn, would result in the three slice media units 130*d*, 130*e* and 130*f* going offline.

The service states of the slice media unit follow the common behavior for media units in the virtual pool 134. Note that moving media units from the virtual pool 134 to the native pool 132 are disallowed in one embodiment of the present invention.

Figure 9:
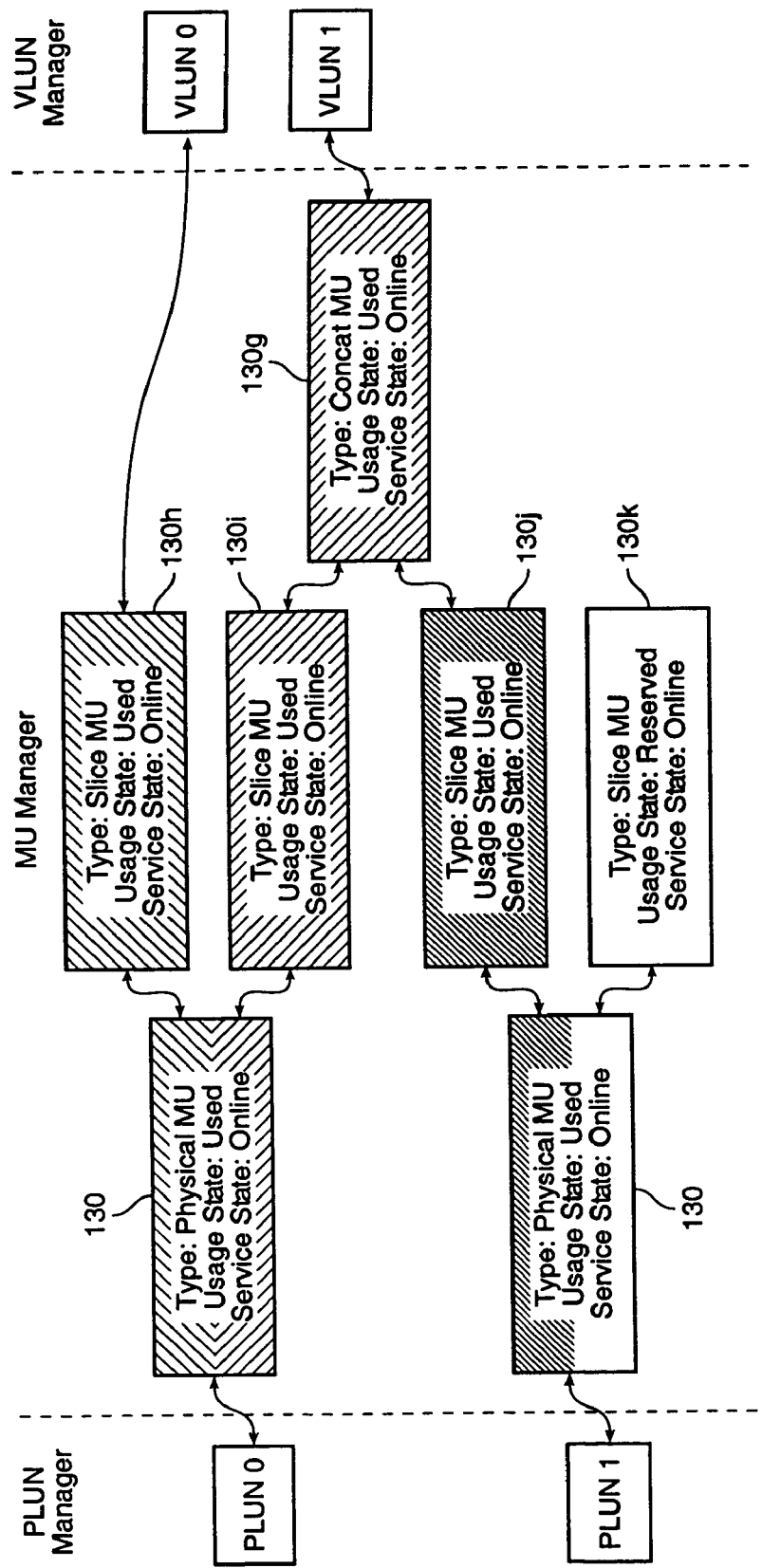
FIG. 9 is a diagram of an exemplary concatenation media unit according to an embodiment of the present invention.

FIG. 9 shows a concatenation media unit 130*g*. A concatenation media unit represents an address space equal to the sum of the address spaces of its child media units. When the user requests a media unit with certain characteristics of a size that is larger than the media units with those characteristics, the media unit manager 120 allows existing, unused media units to be combined into a single, larger address space.

According to one embodiment of the present invention, all media units that make up a concatenation media unit share the same performance characteristics. In addition, all characteristics are the same; e.g., non-raid devices are not concatenated with RAID devices, etc.

A concatenation media unit should obey the following rules:

1. Minimum Number of Members is 2; and
2. Address space is the sum of address spaces of its members (each member size could be different).

In FIG. 9, two physical media units 130 have been carved up into four slice media units 130*h*, 130*i*, 130*j* and 130*k*. One slice media unit 130*h* has been exported to a host using a VLUN. Another slice media unit 130*k* has been reserved for future use. The remaining two slice media units 130*i* and 130*j* have been used as building blocks to create the concatenation media unit 130*g*.

Note that in the example of FIG. 9, if either PLUN 0 or PLUN 1 goes offline, its corresponding physical media unit will go offline as well, which in turn will make its corresponding slice media units 130*h*, 130*i*, 130*j* and 130*k* go offline, which will ultimately make the concatenation media unit 130*g* go offline.

The service states of the concatenation media unit follow the common behavior for media units in the virtual pool 134.

Figure 10:
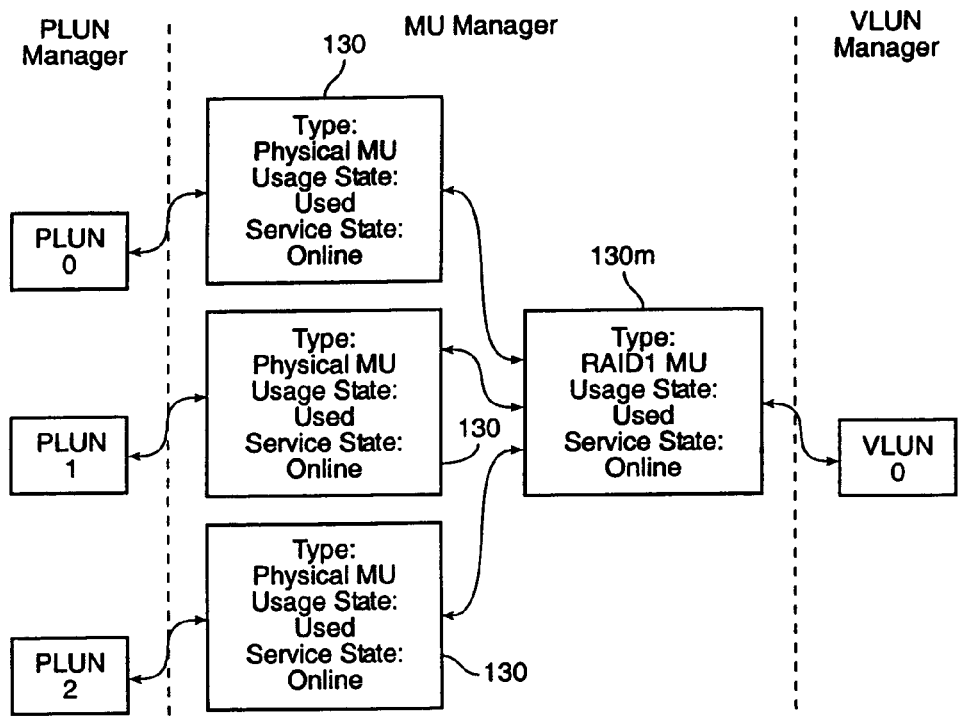
FIG. 10 is a diagram of an exemplary mirrored media unit according to an embodiment of the present invention.

FIG. 10 shows a mirrored media unit 130*m*, also referred to as a RAID1 media unit. (RAID1 is a more specific term and is a subset of the term mirrored. In general, an embodiment of the present invention uses RAID1 media units, but the principles involved are equally applicable to embodiments using mirrored media units.) A RAID1 or mirrored media unit represents an address space with mirrored properties. When the storage configuration manager receives a request to create a reliable media unit, it uses the media unit manager 120 to create a mirrored media unit. Note that there are other ways to achieve a reliable media unit; for example, creating a physical media unit for a PLUN from a physical storage device that is an external mirrored or RAID1 array.

According to one embodiment of the present invention, a mirrored media unit obeys the following rules:

1. Minimum number of members is 2;
2. Maximum number of members is set by a policy in the storage configuration manager;
3. Every member should be on a different physical disk;
4. The address space represented by the mirrored media unit is equal to that of the smallest member;
5. Every member should have their primary paths through different ports on a different line card in the storage server 100; and
6. All members should share the same performance characteristics, unless the user intentionally wants certain members to be faster to facilitate quick/preferred reads, or some of the members are remote. (In such a case, the mirrored media unit will be asynchronous, as described below with reference to FIG. 19.)

In FIG. 10, the mirrored media unit 130*m* has three members; thus, a three-way mirror. Each of the members in FIG. 10 is a physical media unit 130 tied to a physical LUN.

If a PLUN should go offline, its corresponding physical media unit 130 will go offline as well. The mirrored media unit 130*m* will detect this state change and enter a "Degraded" service state. At that point, it will attempt to swap in a spare and perform a reconstruction. Further information on mirrored media units and examples of the reconstruction process can be found in a subsequent portion of the present application.

Figure 11:
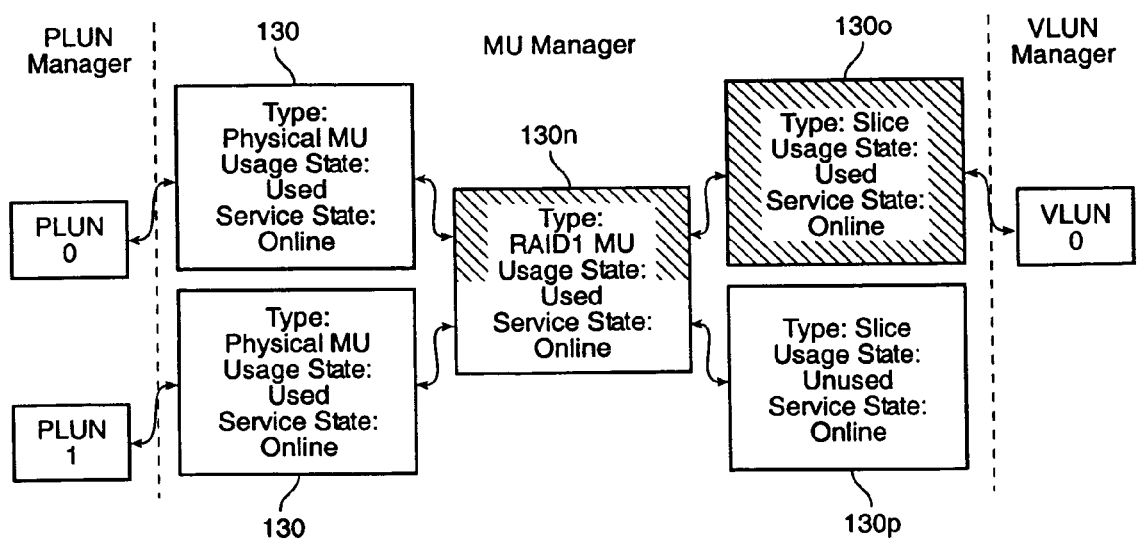
FIG. 11 is a diagram of exemplary mirrored and sliced media units according to an embodiment of the present invention.
Figure 12:
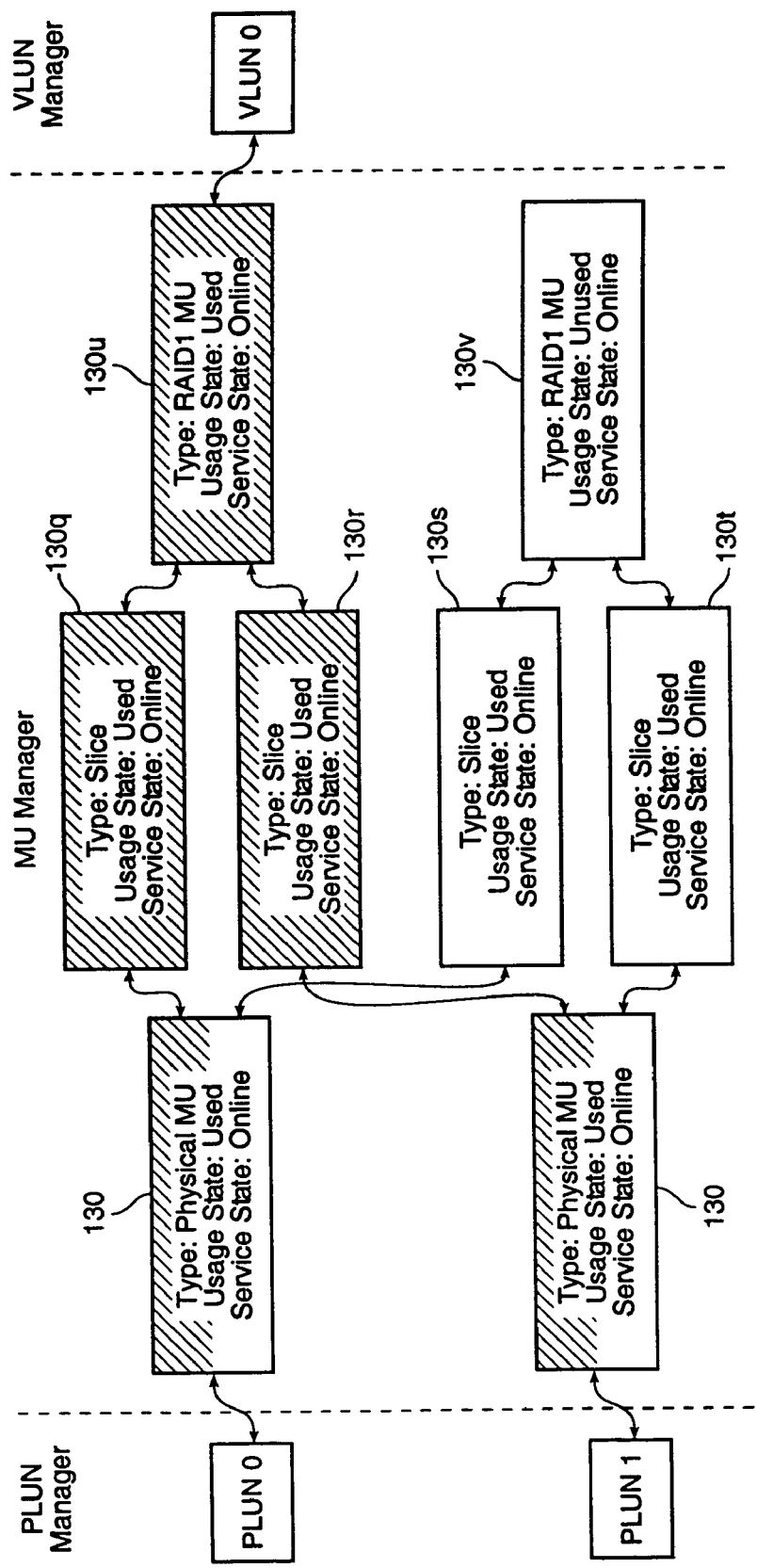
FIG. 12 is a diagram of exemplary sliced and mirrored media units according to an embodiment of the present invention.

FIGS. 11-12 illustrate two techniques of using mirrored media units and slice media units to build "smaller" reliable media units. In FIG. 11, two physical media units 130 are combined into mirrored media unit 130*n*. This mirrored media unit 130*n* is then carved up using two slice media units 130*o* and 130*p*. One slice media unit 130*o* is mapped to a VLUN, and the other slice media unit 130*p* remains unused.

In FIG. 12, two physical media units 130 are each partitioned into two slice media units 130*q*, 130*r*, 130*s* and 130*t*. Two mirrored media units 130*u* and 130*v* are then created using a slice media unit from each PLUN. Although this technique uses more media units than the previous technique, it can provide more flexibility and facilitate a priority algorithm during reconstruction.

Figure 13:
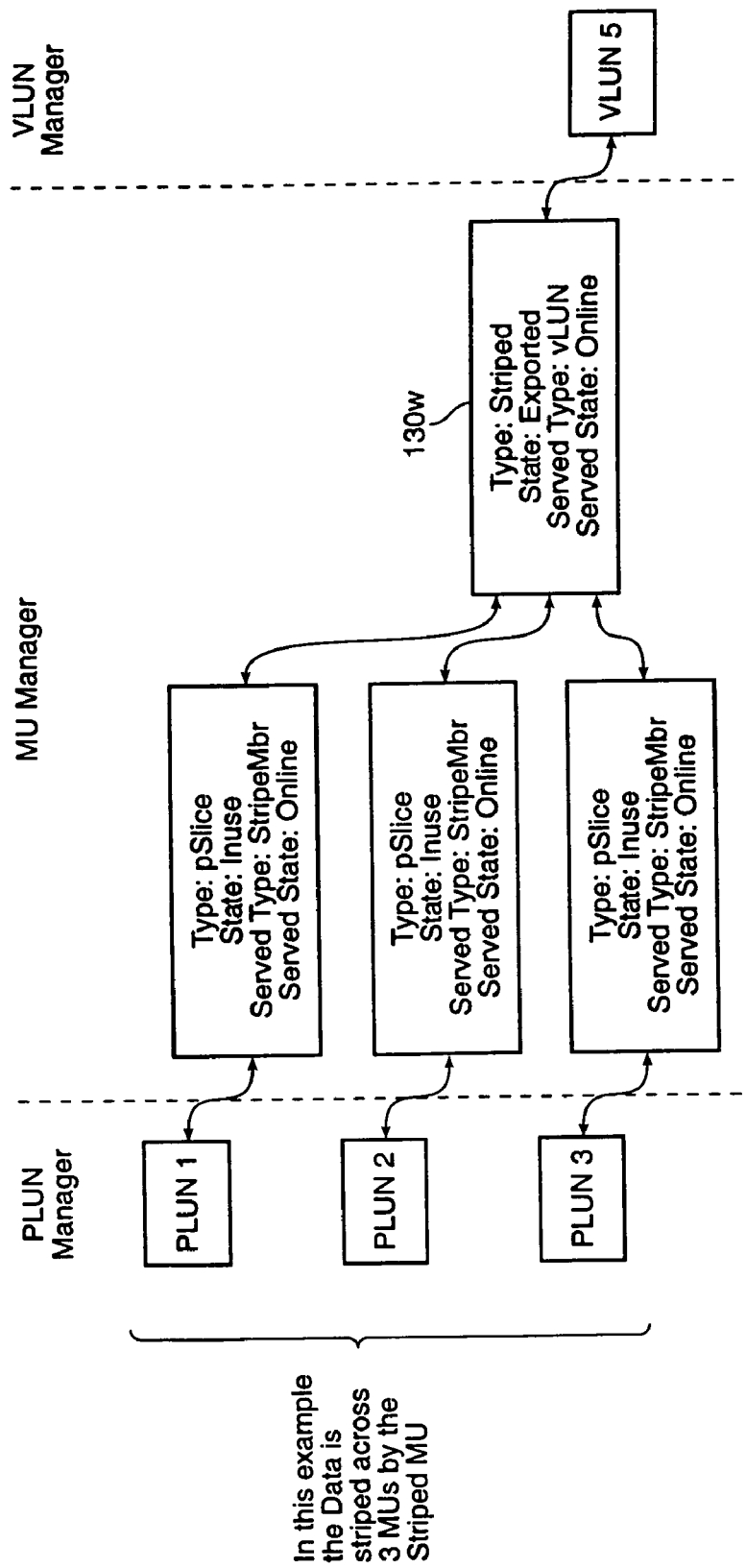
FIG. 13 is a diagram of an exemplary striped media unit according to an embodiment of the present invention.

FIG. 13 shows a striped media unit 130w. As shown, the striped media unit has three members. The data associated with the striped media unit 130w is striped across the three member media units (i.e., the data is striped across the three corresponding PLUNs).

FIGS. 14-19 provide more details on mirrored media units. A mirrored media unit is built from several media units that are referred to as members. The mirrored media unit preferably maintains the "RAID-specific" states of its members. The media units that are members are not required to have knowledge that they are part of a mirror. Those members may simply know that they are "Used" and they are "Online." So, for example, when a reconstruction is in progress according to one embodiment, only the mirrored media unit (and possibly a Reconstruct Process) need know which members are being reconstructed.

Some members may be designated as preferred read members. Preferred read members may be determined based on the member's access time or on load balancing criteria.

Members may be synchronous or asynchronous. Synchronous members behave as write-through members. Asynchronous members behave as write-back members.

In one embodiment, the present invention uses the following strategies concerning spare members. If a member is removed and no writes occur to the mirrored media unit before the member is returned, the member can be added back in. This uses a delayed spare swap until a write occurs or some timeout occurs. If a valid spare does not presently exist, then the storage server 100 may look at other spares in the spare pool and choose to intelligently create a concatenated spare out of it whose size would fit. If the valid spare size is bigger than the one needed, then the storage server 100 may slice the spares. Global spares may be made available to all mirrored media units. According to another embodiment, the storage server 100 may make global spares available depending upon each customer account. Finally, dedicated spares may be assigned to a specific mirrored media unit.

According to one embodiment, the following long-running processes are associated with a mirrored media unit: verify, reconstruct, and snapshot/synchronize/write logging. The verify process verifies that the data across the members is in synch. The reconstruct process, after a spare is swapped in to replace a failed member, restores the data on such new member.

The snapshot/synchronize/write logging process operates as follows. If a member is temporarily removed for a snapshot, all writes are logged. When the member is returned, it is quickly resynchronized. If the write log is full, the member is reconstructed.

A mirrored media unit may maintain the "RAID-specific" states of its members. According to one embodiment, an associative class may be used to encapsulate information on the member relationship. According to another embodiment, a set of RAID properties may be appended to the member media units. In either embodiment, the media units that are members need have no knowledge that they are part of a mirrored media unit. In other words, a member may simply know that it is "Used" and "Online." It does not need to know that it is being reconstructed.

When all of the members of a mirrored media unit are online, the mirrored media unit is in the Online-Fully Redundant state. If any of the members are not online, but the mirrored media unit is still providing redundancy using at least two online members, the mirrored media unit is in the Online-Degraded state. If the mirrored media unit is down to one online member, it enters the Online-Critical state.

The following are examples of RAID-specific states of the members:

1. Member Online;
2. Member Offline;
3. Member Re-Synchronizing; and
4. Member Reconstructing.

Figure 14A:
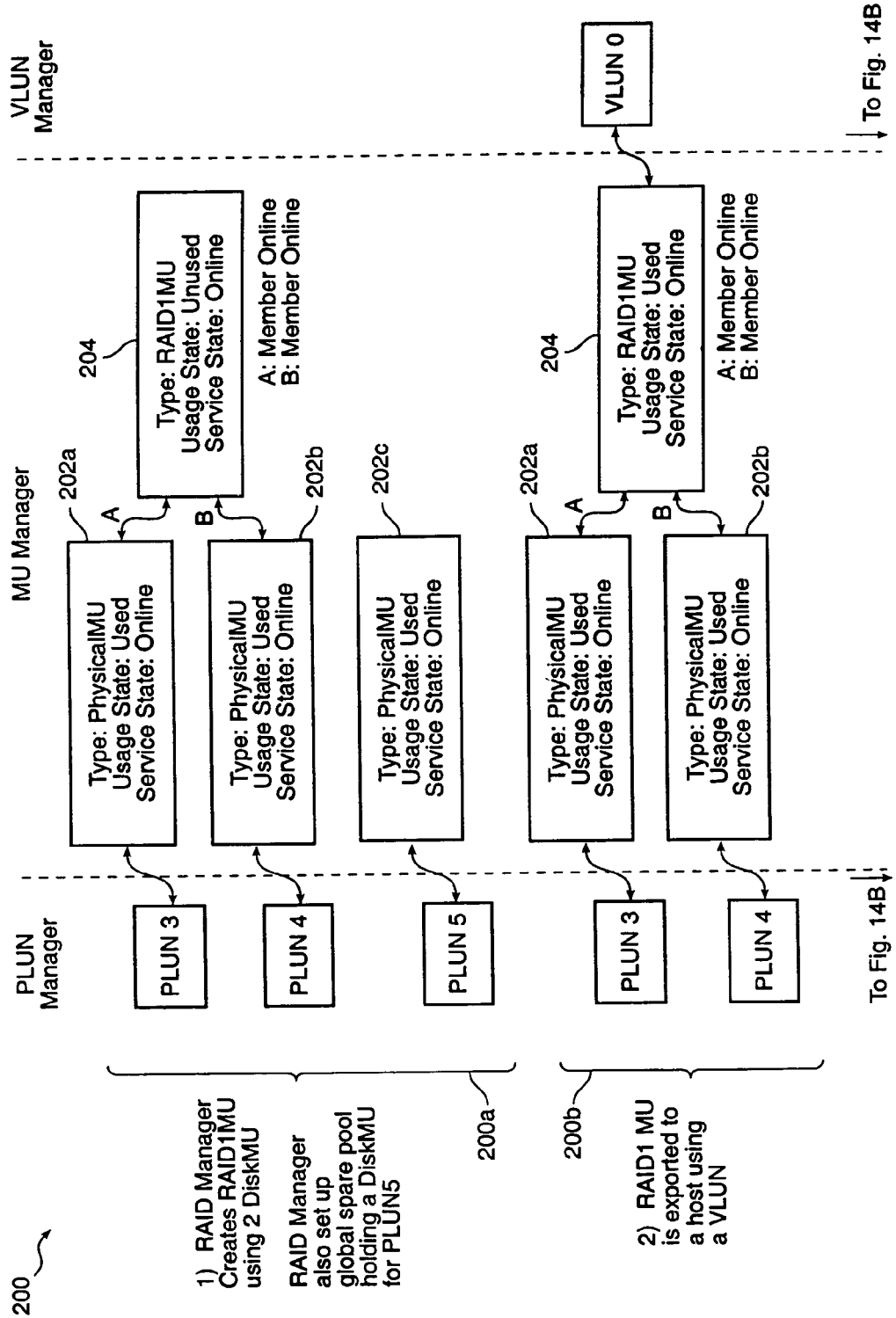
FIG. 14 is a diagram of a reconstruction process using a mirrored media unit according to an embodiment of the present invention.
Figure 14B:
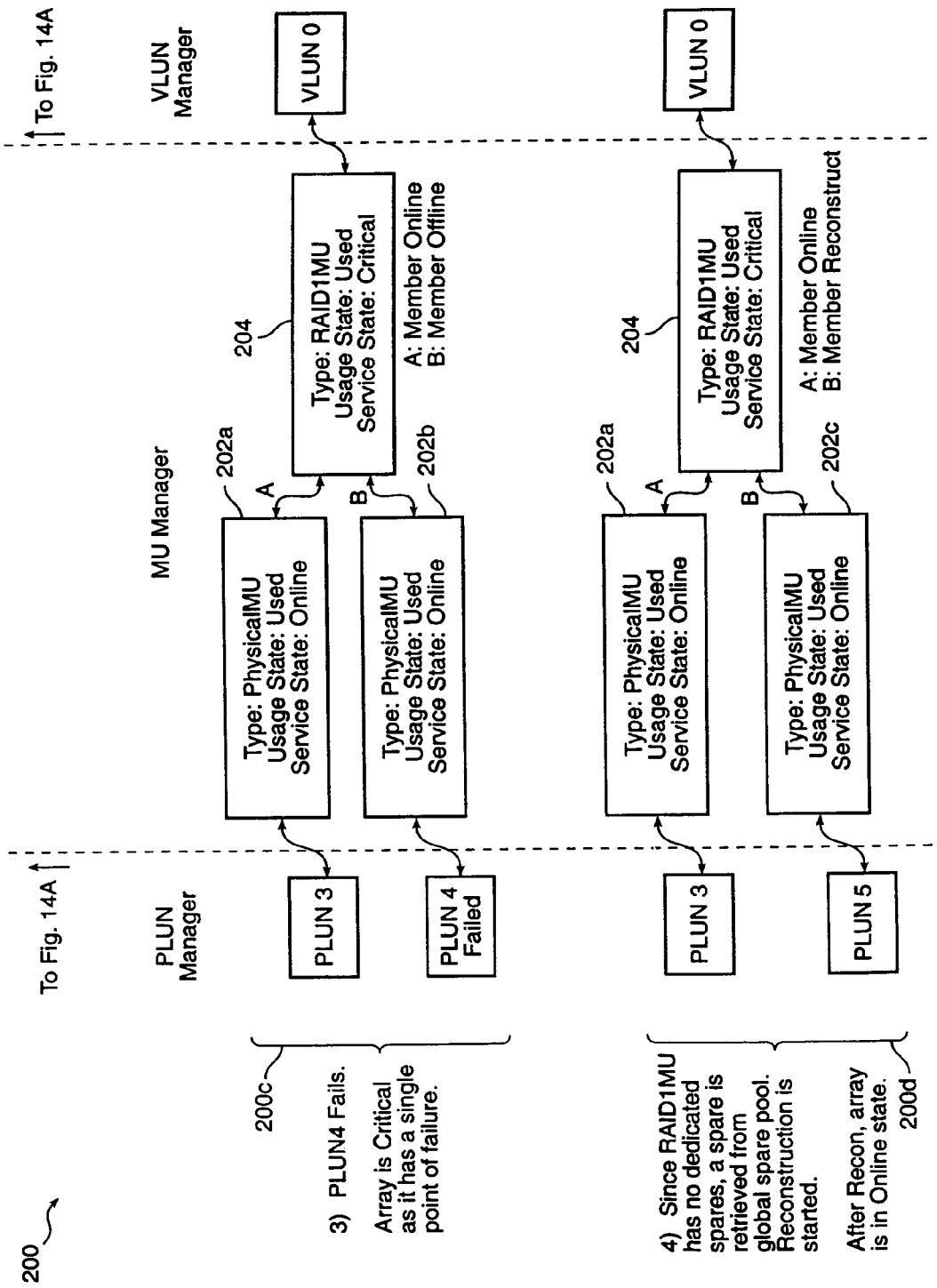

FIG. 14 shows an example of a process 200 of reconstructing a mirrored media unit according to one embodiment. In step 200a, the media unit manager 120 creates a mirrored media unit 204 using two physical (disk) media units 202a and 202b. The media unit manager 120 also sets up a global spare pool with a disk media unit 202c. The media unit manager 120 may use a subprocess/subcomponent/subprogram called a RAID manager to perform these functions.

In step 200b, the media unit manager 120 exports the mirrored media unit 204 to a host using a VLUN.

In step 200c, the PLUN associated with the disk media unit 202b fails. The mirrored media unit 204 is critical because it has a single point of failure.

In step 200d, the mirrored media unit 204 has no dedicated spares, a spare (the disk media unit 202c) is retrieved from the global spare pool. The media unit manager 120 begins reconstruction of the data of the mirrored media unit 204 onto the disk media unit 202c. After reconstruction, the mirrored media unit returns to the online state.

Although FIG. 14 gives a specific example for a mirrored media unit with two members, the process is also applicable to mirrored media units with more members.

Figure 15A:
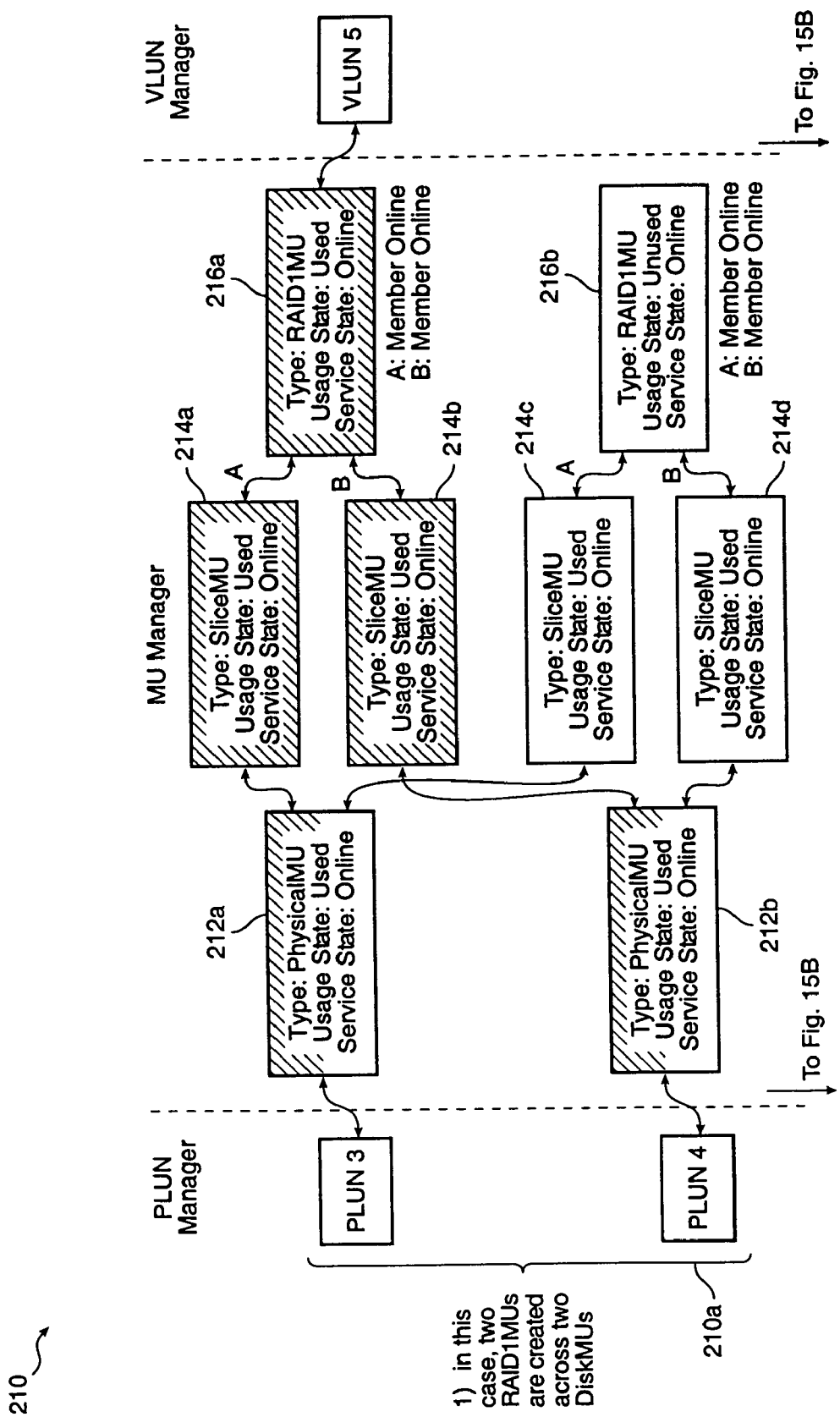
FIG. 15 is a diagram of a reconstruction process using slice media units and a mirrored media unit according to an embodiment of the present invention.
Figure 15B:
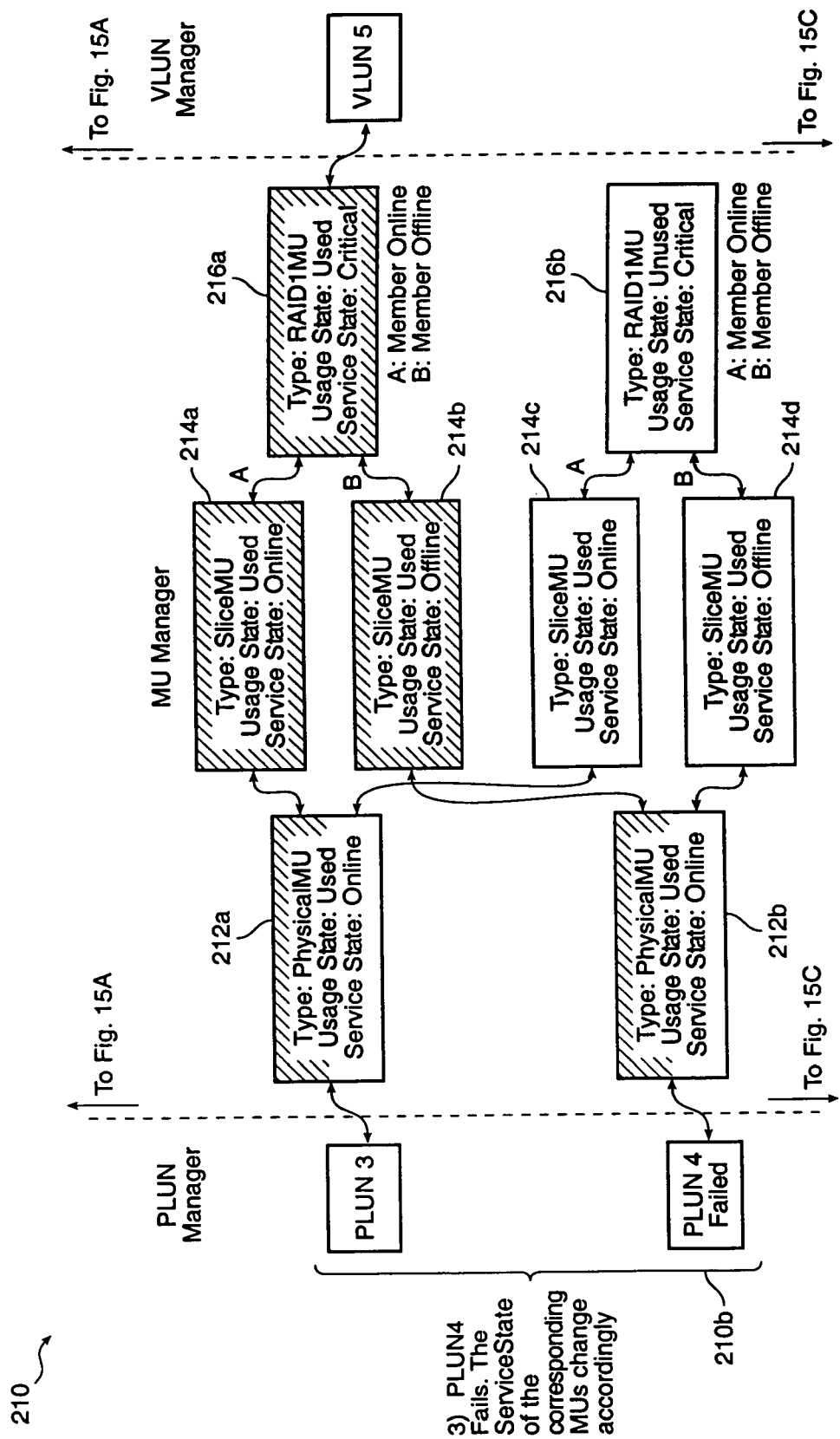
Figure 15C:
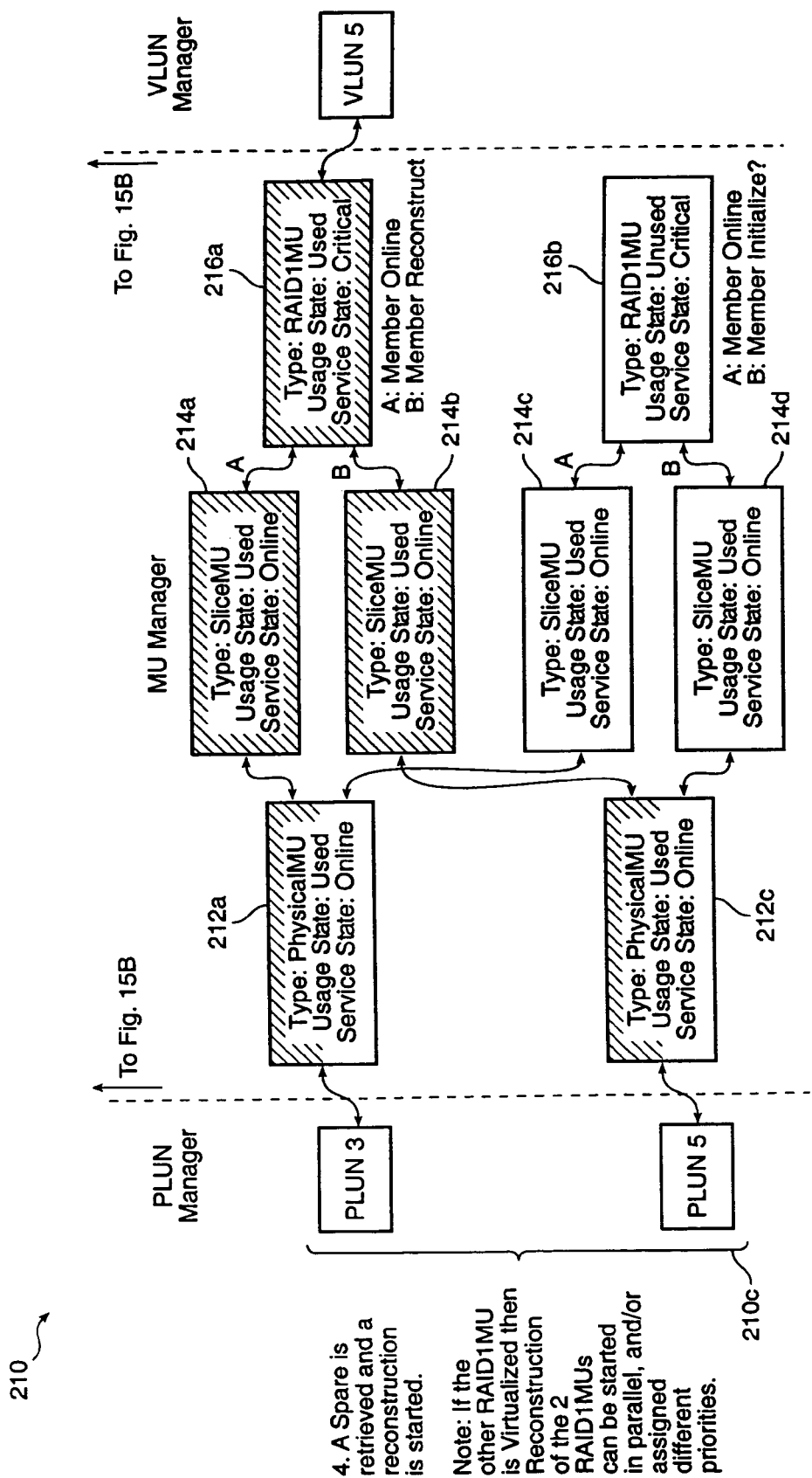

FIG. 15 shows an example of a process 210 of reconstructing a mirrored media unit that is made from slice media units, according to one embodiment. In step 210a, the media unit manager 120 creates two mirrored media units 216a and 216b across two disk media units 212a and 212b that are sliced into four slice media units 214a, 214b, 214c and 214d. The mirrored media unit 216a is used, being mapped to a host using a VLUN. The mirrored media unit 216b is unused.

In step 210b, the PLUN corresponding to the disk media unit 212b fails. This removes the availability of the slice media unit 214b from the mirrored media unit 216a, which enters a critical service state as it has only a single point of failure (i.e., the slice media unit 214a, corresponding to the disk media unit 212a, corresponding to the single remaining PLUN).

In step 210c, a spare is retrieved and mapped to a new disk media unit 212c. The media unit manager 120 starts reconstruction on the disk media unit 212c.

Although the mirrored media unit 216b is shown in FIG. 15, it is in an unused state. Thus, it does not need to be involved in the process 210. However, if the mirrored media unit 216b is mapped to a host using a VLUN or is otherwise in the used state, since it is virtualized, then the media unit manager 120 in step 210c can reconstruct the mirrored media unit 216b in parallel with the reconstruction of the mirrored media unit 216a. Alternatively, the media unit manager 120 may also assign a different priority to the reconstruction of the mirrored media unit 216b versus that of the mirrored media unit 216a.

Figure 16:
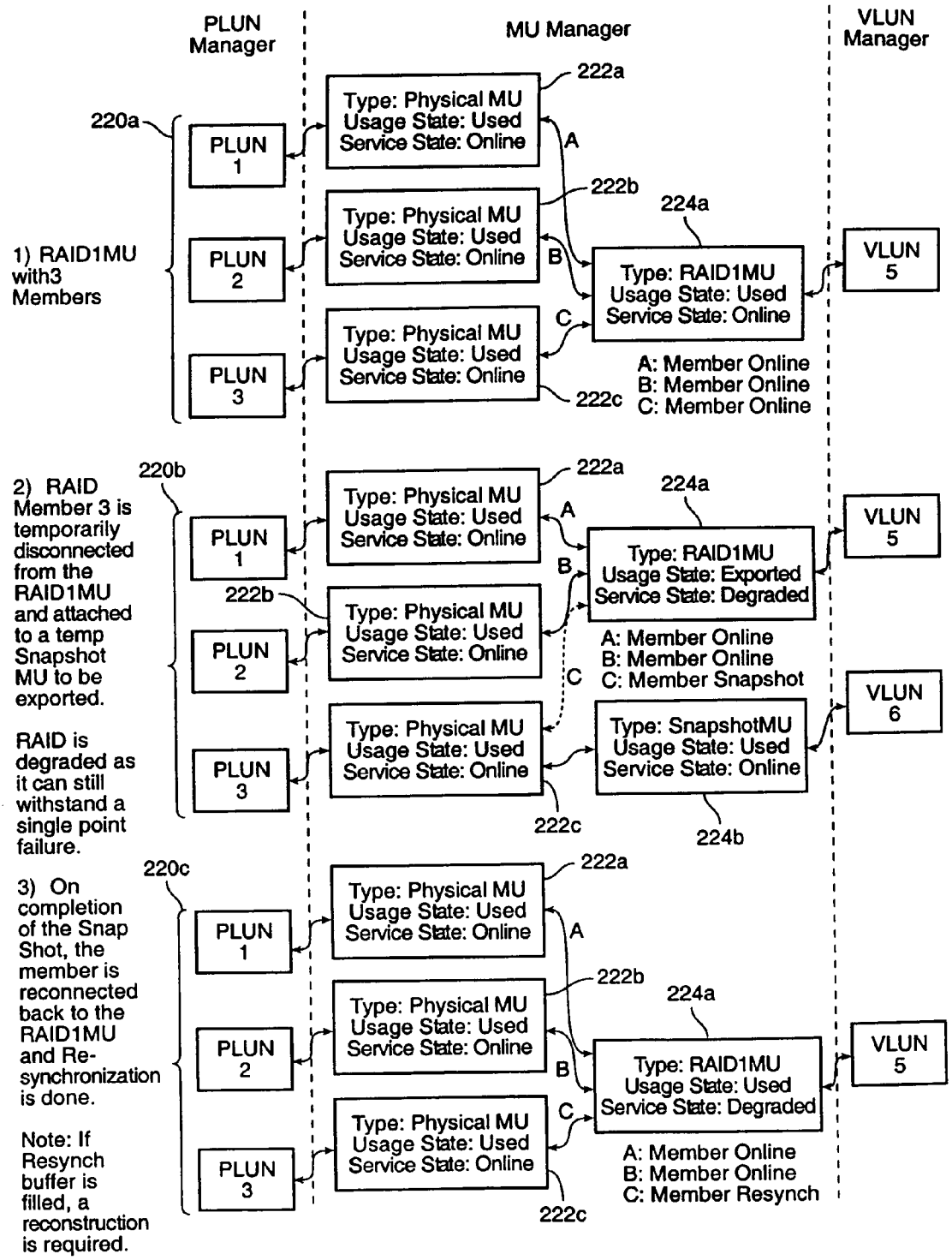
FIG. 16 is a diagram of a snapshot process using a mirrored media unit according to an embodiment of the present invention.

FIG. 16 shows an example of a process 220 of using a mirrored media unit to create a snapshot media unit, according to one embodiment. In step 220a, the media unit manager creates a mirrored media unit 224a using three members, physical media units 222a, 222b and 222c. (To create a snapshot, generally three or more members are preferred, as will be made apparent in subsequent steps.)

In step 220b, the third member (physical media unit 222c) of the mirrored media unit 224a is temporarily disassociated therefrom and is associated with a snapshot media unit 224b.

The mirrored media unit 224a is degraded and can still withstand a single point failure, as it still has two members. The snapshot media unit 224b may be mapped to a VLUN, exported to a host, etc.

In step 220c, the physical media unit 222c is re-associated with the mirrored media unit 224a. The physical media unit 222c is then resynchronized. If the resynchronization buffer of the storage server 100 is full, a reconstruction may be performed.

Figure 17:
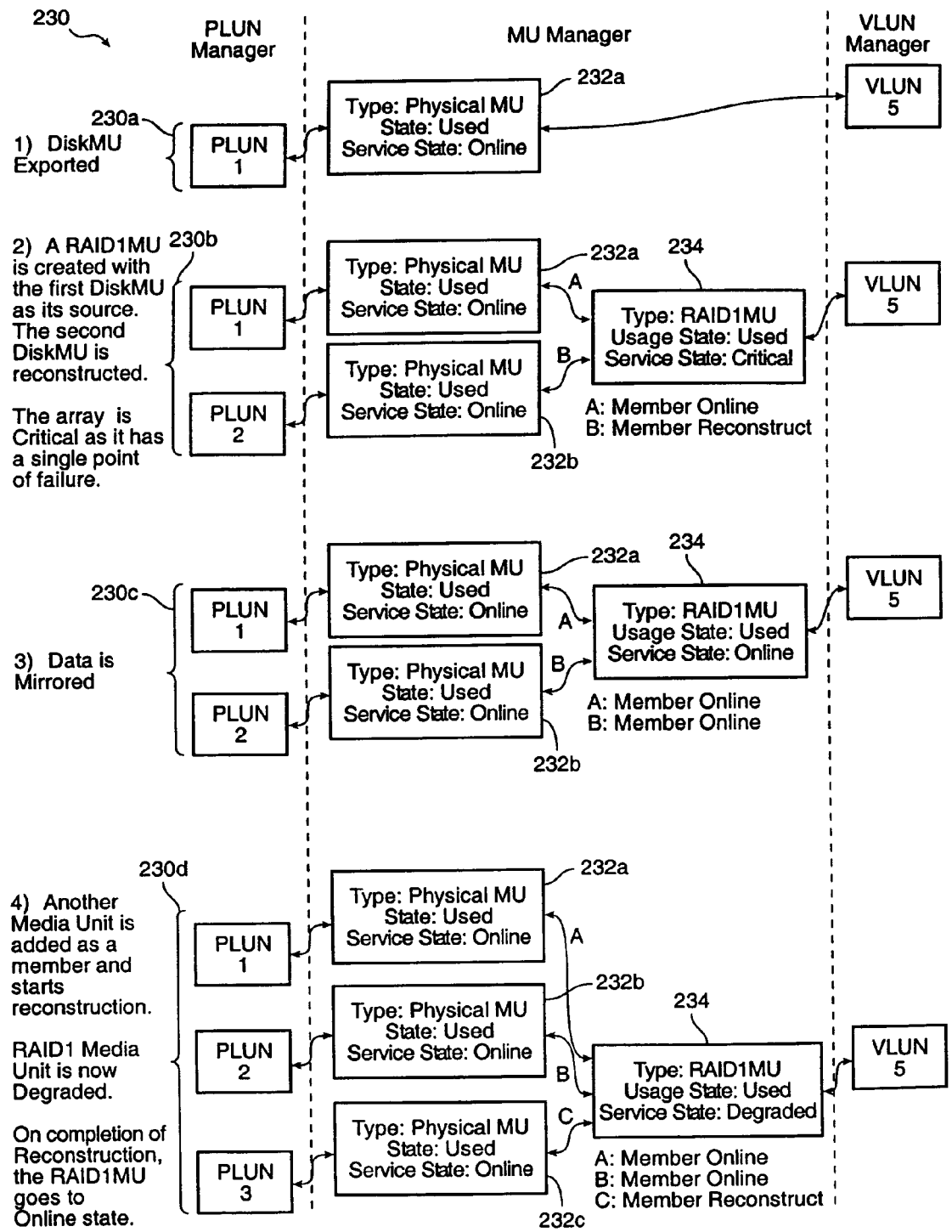
FIG. 17 is a diagram of a non-RAID to RAID conversion process according to an embodiment of the present invention.

FIG. 17 shows an example of a process 230 of non-RAID to RAID conversion and adding RAID members. In step 230a, there is no RAID media unit; the media unit manager directly exports the physical media unit 232a to a VLUN.

In step 230b, the media unit manager creates a mirrored media unit 234 using the physical media unit 232a as its source. The second member of the RAID, the physical media unit 232b, is reconstructed. The array is critical because it has a single point of failure.

In step 230c, reconstruction is complete and the data is now mirrored. The mirrored media unit 234 is in the online service state (normal operation).

In step 230d, a third member (physical media unit 232c) is added and reconstruction is started on it. The mirrored media unit 234 is in a degraded state until reconstruction is completed. At that point, the mirrored media unit 234 is in the online service state.

Figure 18:
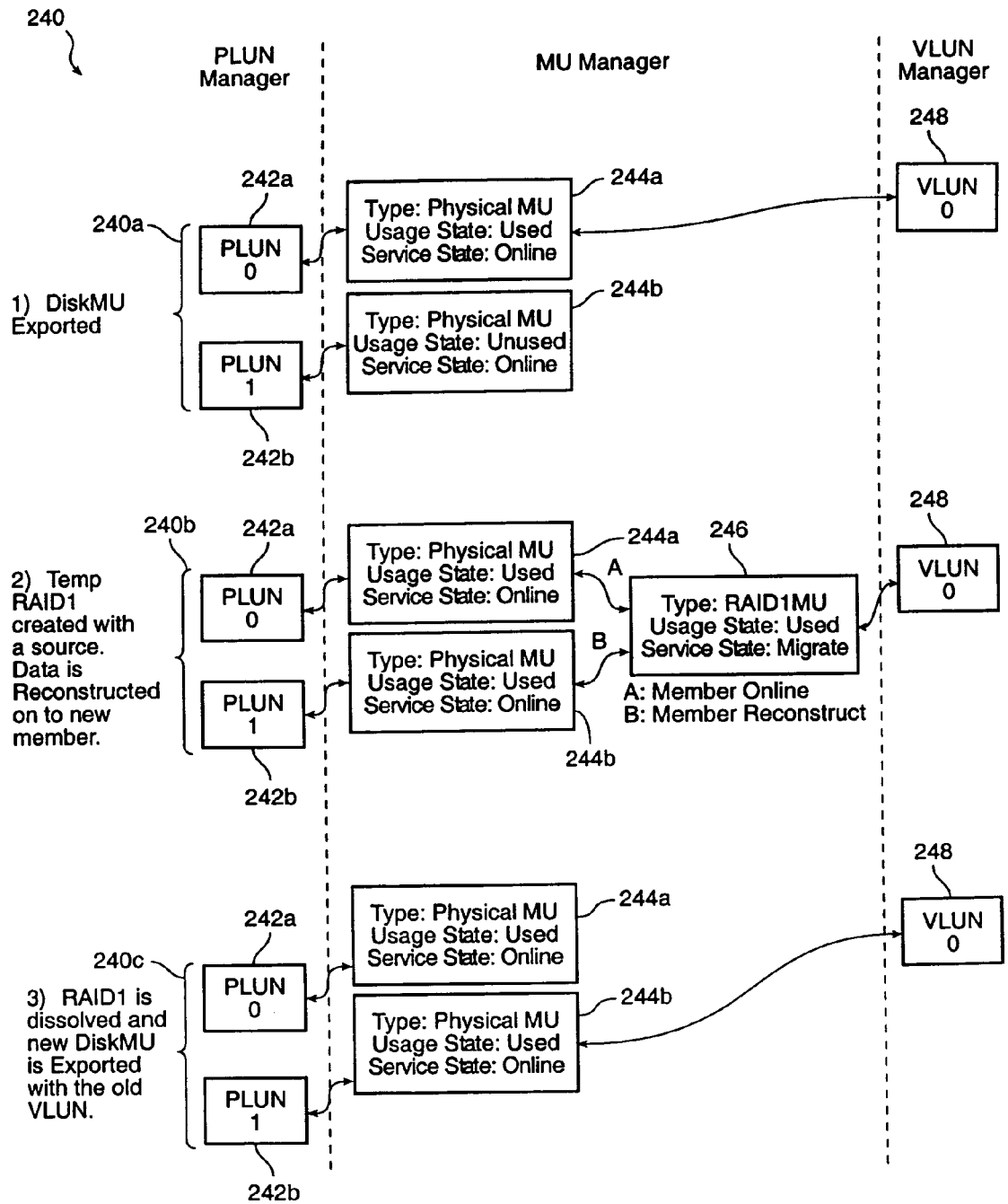
FIG. 18 is a diagram of a VLUN migration process according to an embodiment of the present invention.

FIG. 18 shows an example of a process 240 of VLUN migration. VLUN migration describes associating an existing VLUN with a new PLUN. In step 240a, the PLUN 242a is associated with the physical media unit 244a, which is exported to the VLUN 248. The physical media unit 244b is associated with the PLUN 242b.

In step 240b, the VLUN 248 is associated with a mirrored media unit 246. The mirrored media unit 246 is associated with the physical media units 244a and 244b. The data is reconstructed on the physical media unit 242b. The mirrored media unit 246 has a service state of "migrate."

In step 240c, the physical media unit 244b is exported to the existing VLUN 248. The mirrored media unit 246 is no longer needed and may be dissolved.

A similar process can be used for VLUN replication. In summary, steps 240a and 240b proceed as described above. Once reconstruction is complete, the VLUN 248 is associated with the physical media unit 244a and a second VLUN (not shown) is created and associated with the physical media unit 244b.

Figure 19:
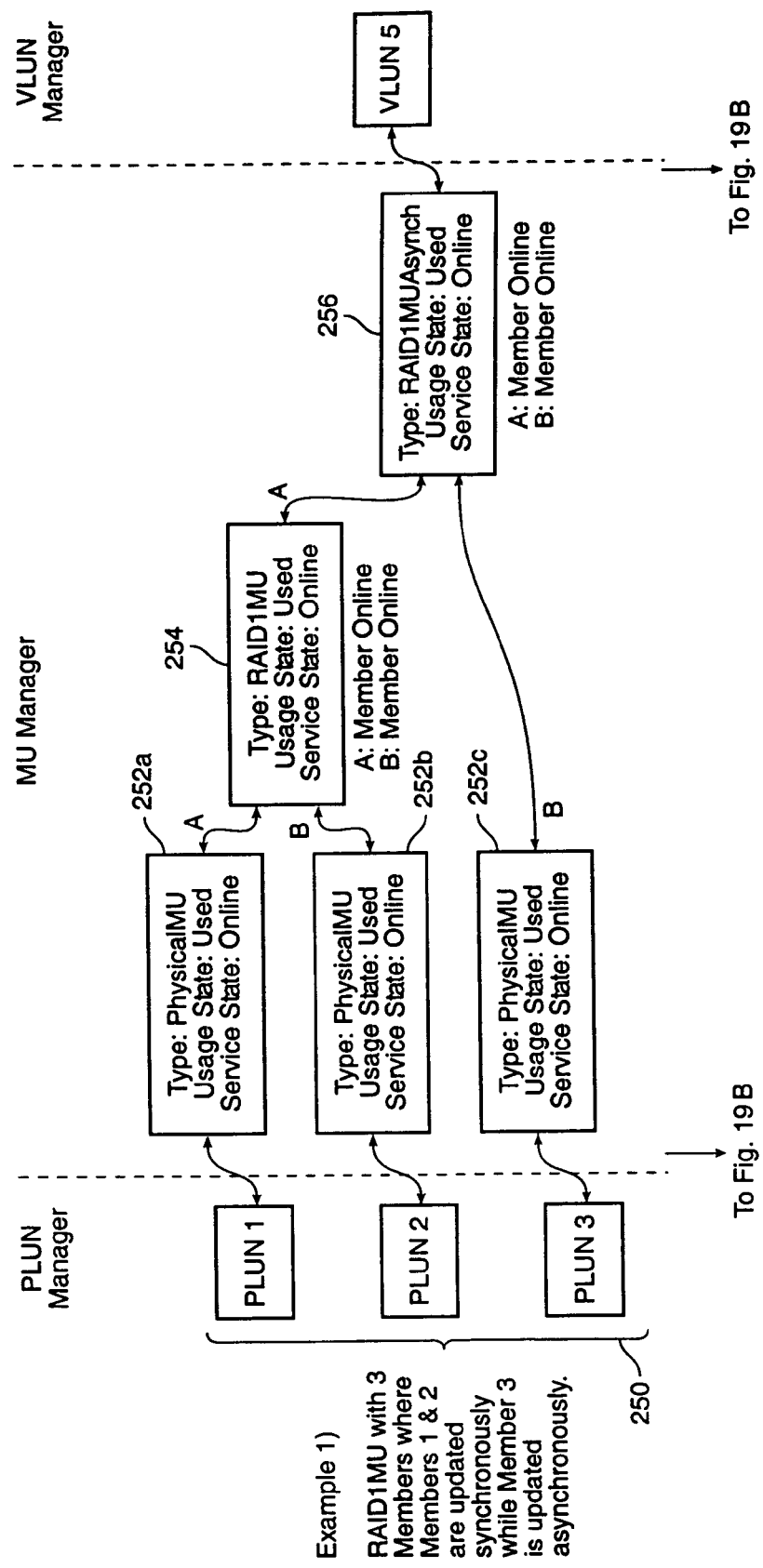
FIG. 19 is a diagram showing examples of media units with synchronous and asynchronous members according to an embodiment of the present invention.
Figure 19B:
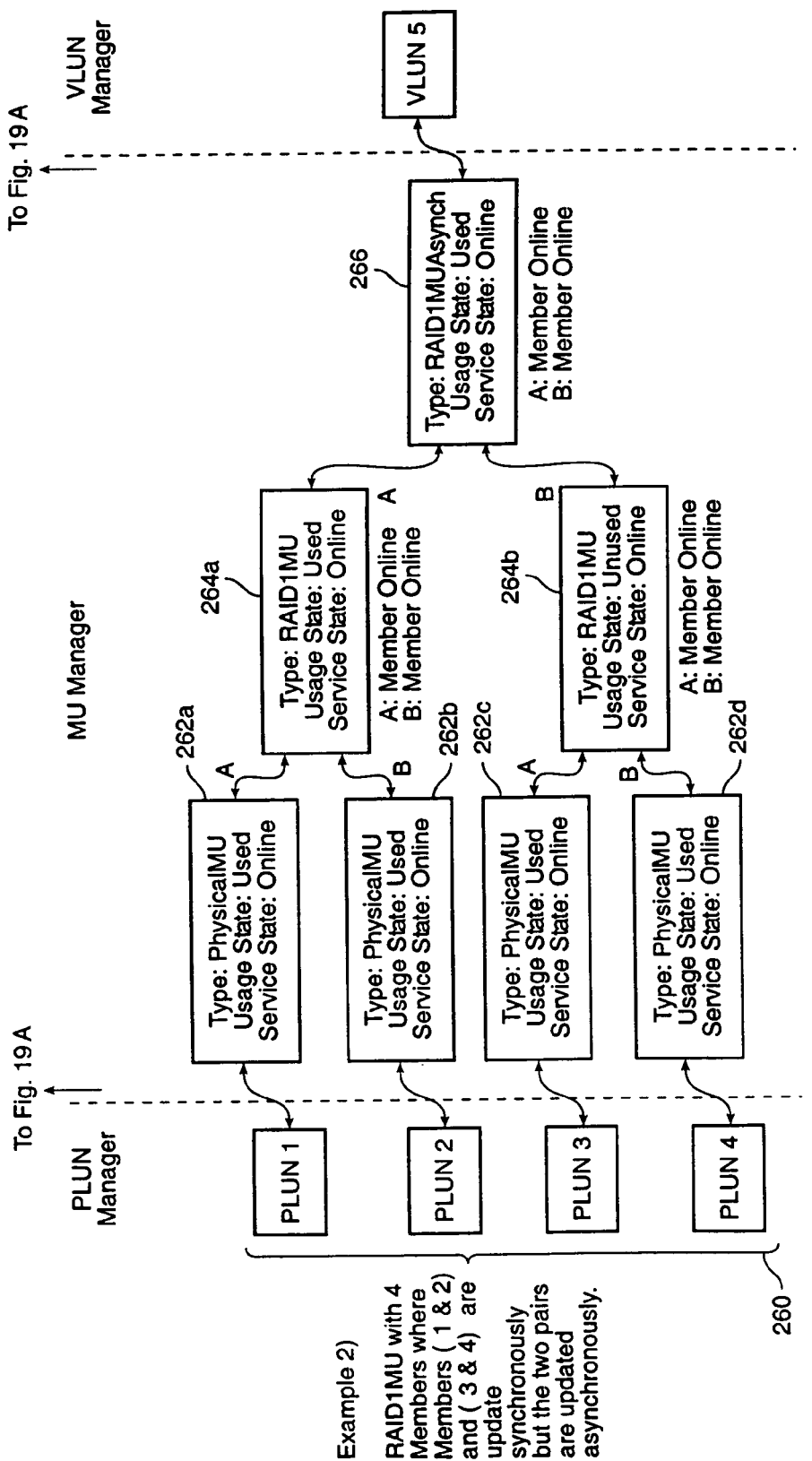

FIG. 19 shows examples of mirrored media units with synchronous and asynchronous members. A member may be updated asynchronously if its performance parameters differ from those of the other members, if it is located at a different location from the other members, if the network administrators so desire, or for other reasons.

In the example 250, three physical media units 252a, 252b and 252c are respectively associated with three PLUNs. A mirrored media unit 254 having two members is built using the two physical media units 252a and 252b. A mirrored media unit 256 is built using the mirrored media unit 254 and the physical media unit 252c. The mirrored media unit 256 is asynchronous because the mirrored media unit 254 is updated synchronously and the physical media unit 252c is updated asynchronously. The asynchronous mirrored media unit 256 is mapped to a VLUN.

Although in the example 250 the asynchronous mirrored media unit 256 is in effect a "third level" in the media unit hierarchy, an asynchronous media unit can also be created at another level. For example, an asynchronous media unit can be built from two or more physical media units (the "first level" in the media unit hierarchy), in which case such asynchronous media unit would be in the "second level" in the media unit hierarchy.

In the example 260, four physical media units 262a, 262b, 262c and 262d are respectively associated with four PLUNs. A first mirrored media unit 264a having two members is built using the two physical media units 262a and 262b, and a second mirrored media unit 264b having two members is built using the two physical media units 262c and 262d. Another mirrored media unit 266 is built using the two mirrored media units 264a and 264b. The mirrored media unit 266 is asynchronous because the mirrored media units 264a and 264b are updated asynchronously. The asynchronous mirrored media unit 266 is mapped to a VLUN.

Figure 20A:
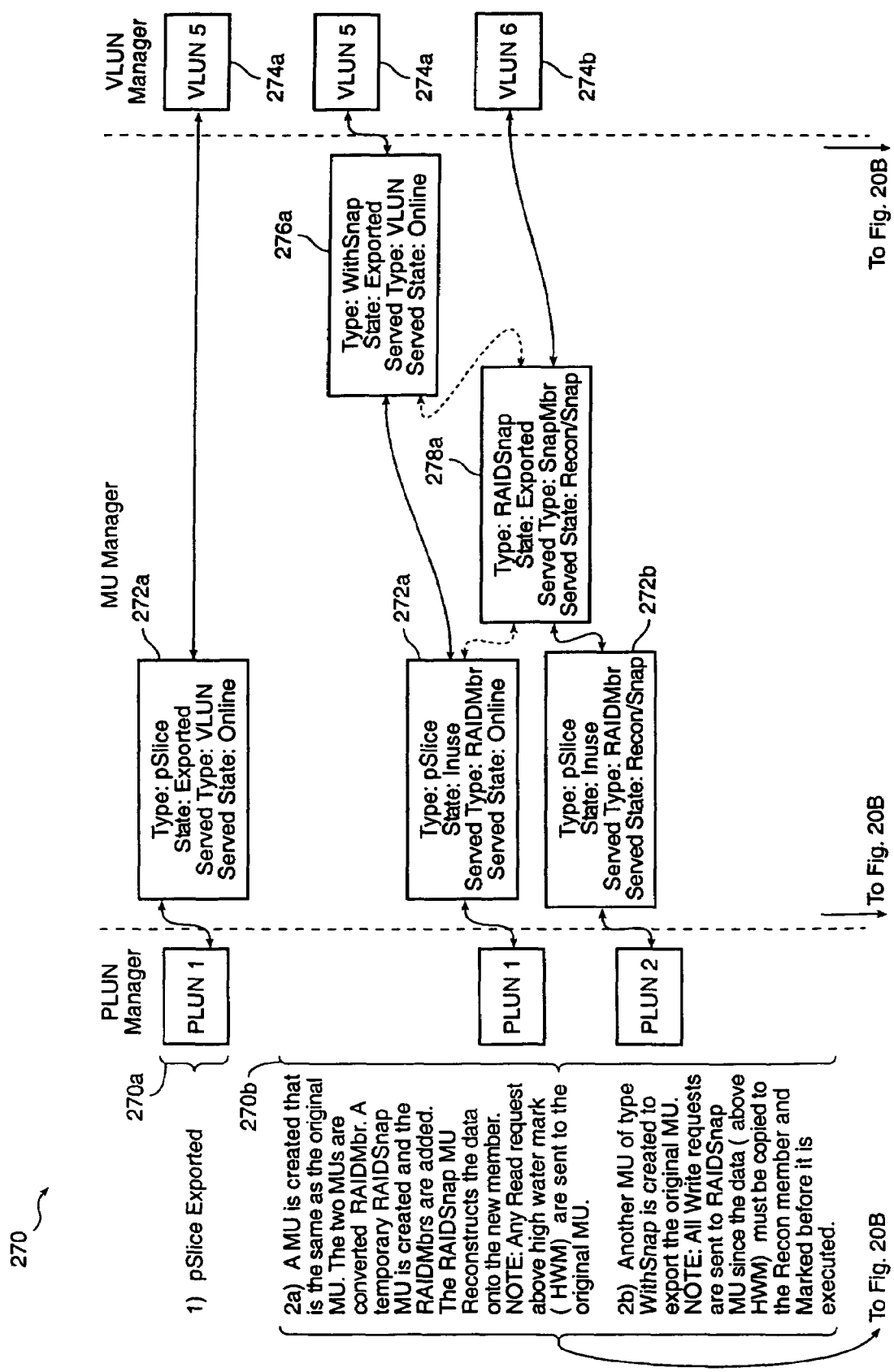
FIG. 20 is a diagram of another snapshot process according to an embodiment of the present invention.
Figure 20B:
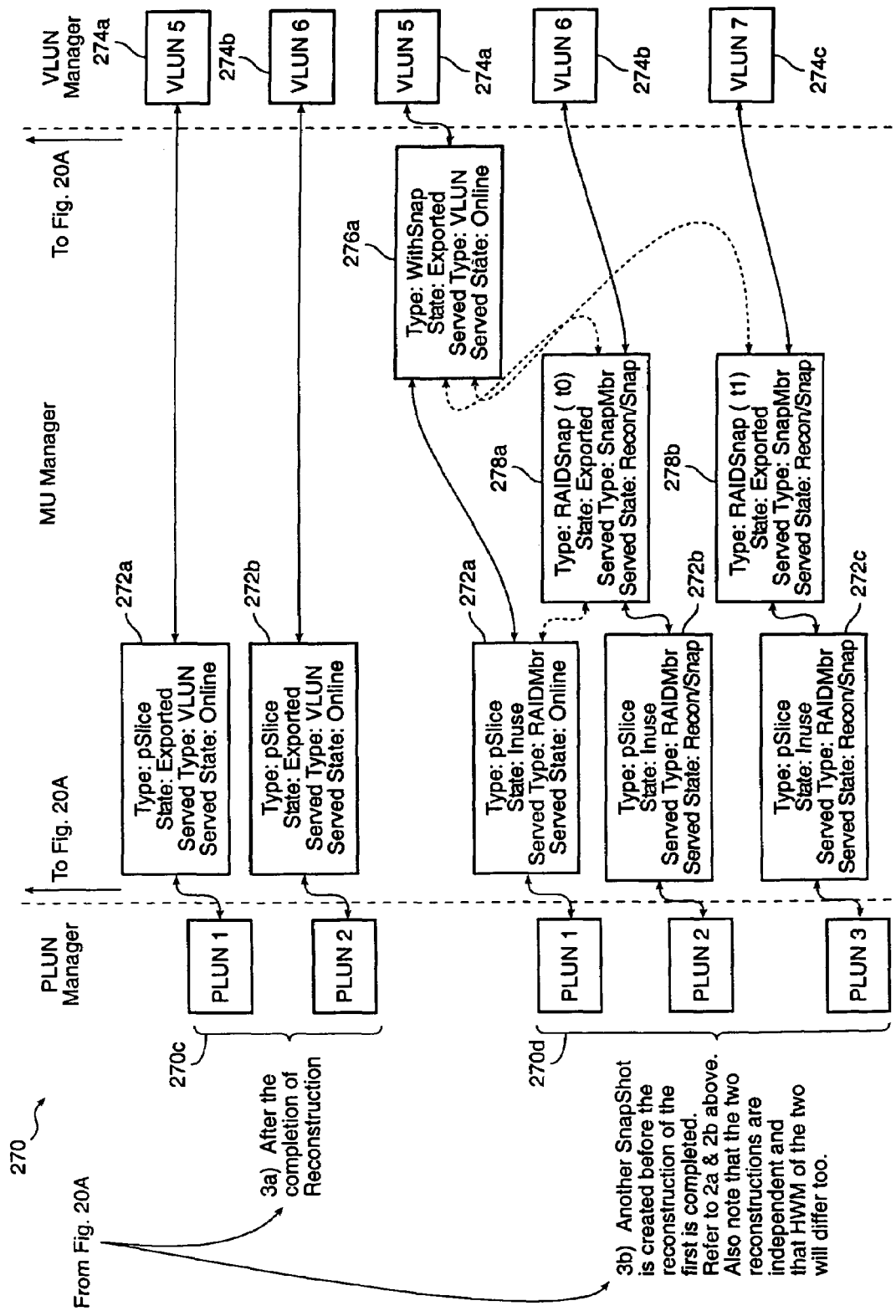
Figure 21A:
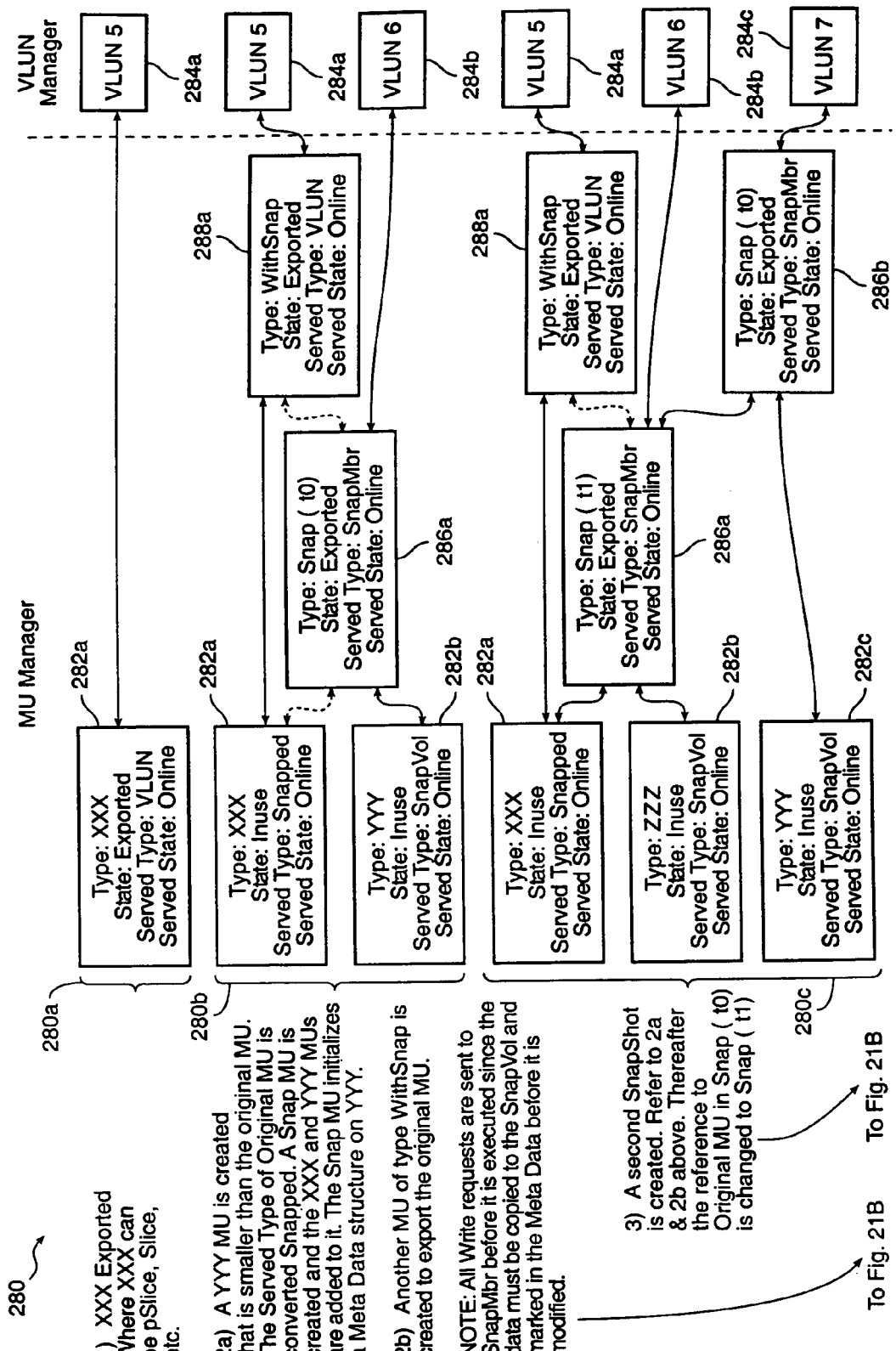
FIG. 21 is a diagram of yet another snapshot process according to an embodiment of the present invention.
Figure 21B:
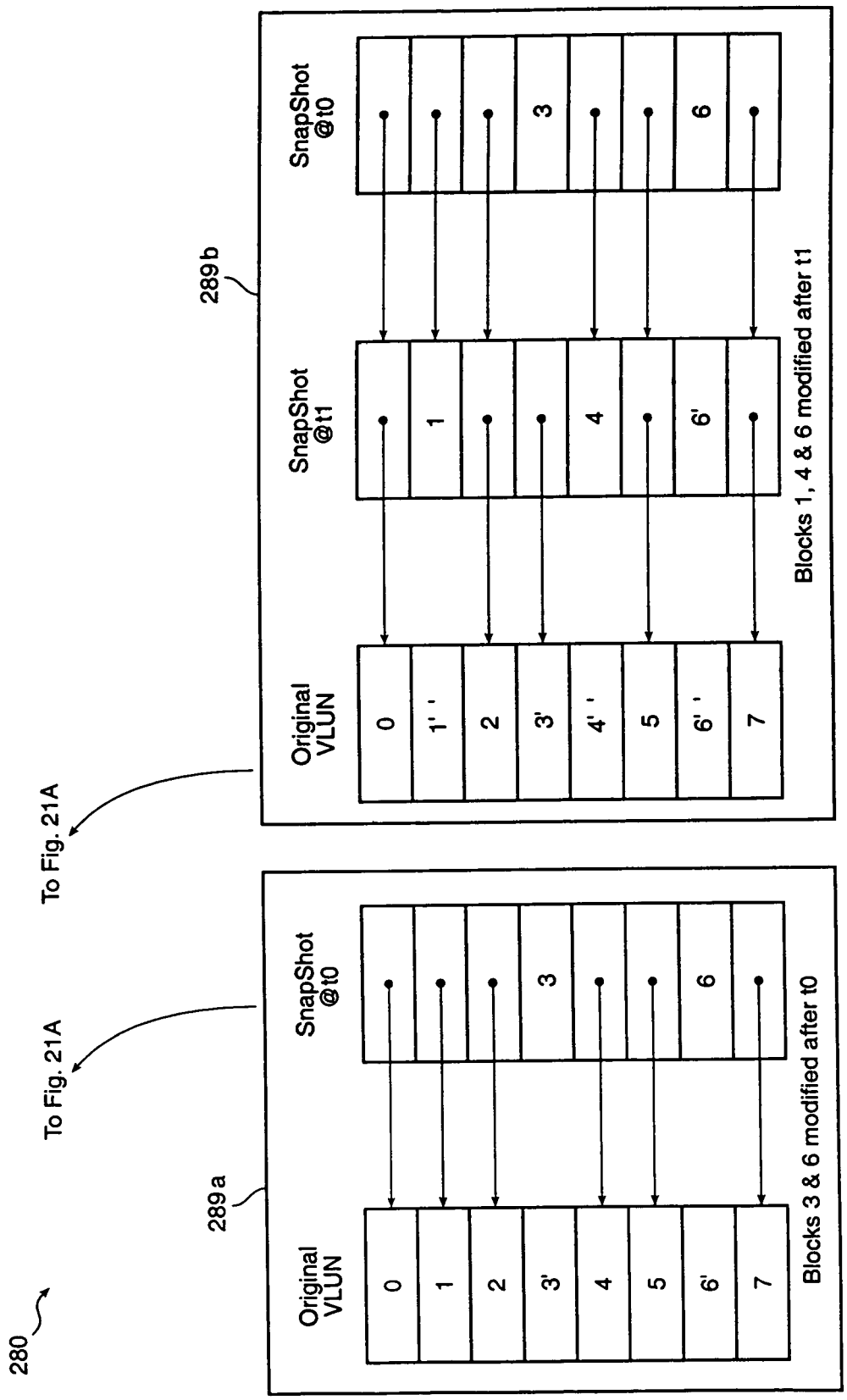

FIGS. 20-21 provide more details concerning snapshots.

FIG. 20 shows an example of a process 270 of creating a snapshot by adding a full member. In step 270a, the media unit manager exports a slice media unit 272a to a VLUN 274a.

In step 270b, the media unit manager creates another media unit 272b that is the same as the slice media unit 272a. The media unit manager creates a temporary mirrored snapshot media unit 278a with the two slice media units 272a and 272b as members. The media unit manager issues instructions for the temporary mirrored snapshot media unit 278a to reconstruct the data of the original slice media unit 272a onto the new slice media unit 272b. Note that in one embodiment of the present invention, any read request above the high water mark is sent to the original slice media unit 272a (until reconstruction has been completed).

Then the media unit manager creates a media unit 276a of type WithSnap to export the original media unit 272a. Note that in one embodiment of the present invention, write requests are sent to the mirrored snapshot media unit 278a since the data above the high water mark should be copied to the reconstruction member and marked before it is executed.

The temporary mirrored snapshot media unit 278a is exported to a VLUN 274b.

In step 270c, after completion of the reconstruction, the media unit 272a is mapped to the VLUN 274a, and the media unit 272b is mapped to the VLUN 274b.

In step 270d, prior to reconstruction of the first snapshot, the media unit manager creates a second mirrored snapshot media unit 278b. The mirrored snapshot media unit 278b has as its members the media unit 272a and a new media unit 272c. Refer to step 270b for the creation of the second mirrored snapshot media unit 278b. Note that in one embodiment of the present invention, the two reconstructions may be independent and that the high water mark of the two may differ as well.

FIG. 21 shows an example of a process 280 of creating a snapshot using a reference-based algorithm. To simplify the figure, the PLUNs are not shown.

In step 280a, the media unit manager exports the media unit 282a to a VLUN 284a. The media unit 282a may be of type slice, etc.

In step 280b, the media unit manager creates a media unit 282b. The media unit 282b may be smaller than the media unit 282a. The media unit manager converts the served type of the media unit 282a to "snapped." The media unit manager creates a snapshot media unit 286a and adds the media units 282a and 282b thereto. The time the snapshot media unit 286a is created is termed time t0. The media unit manager maps the snapshot media unit 286a to a VLUN 284b. The media unit manager instructs the snapshot media unit 286a to initialize a meta data structure on the media unit 282b.

The media unit manager creates another media unit 288a of type "WithSnap" to export the original media unit 282a to the VLUN 284a.

Note that in one embodiment of the present invention, the media unit manager sends write requests to the snapshot media unit 286a before they are executed since the data should be copied to the media unit 282b and marked in the meta data before it is modified. For example, consider the table 289a, in which blocks 3 and 6 have been modified after time t0.

In step 280c, the media unit manager creates a second snapshot media unit 286b in accordance with step 280b above. The time the snapshot media unit 286b is taken is termed time t0, and the time reference of the original snapshot media unit 286a is now referred to as time t1.

Consider the example shown in table 289b. Blocks 3 and 6 are modified after time t0 as in table 289a. Blocks 1, 4 and 6 are modified after t1.

Figure 22:
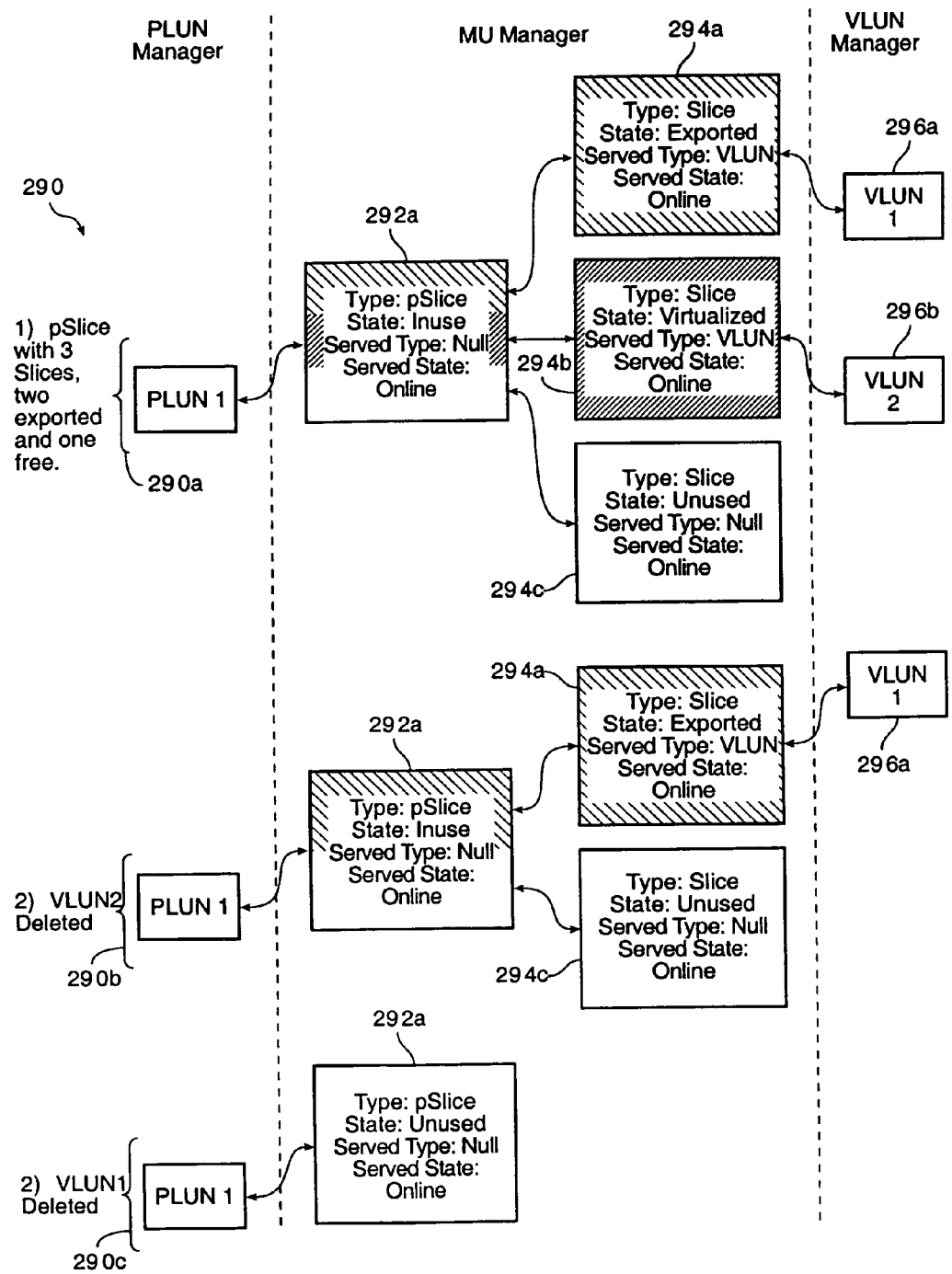
FIG. 22 is a diagram of a process of merging media units according to an embodiment of the present invention.

FIG. 22 shows an example of a process 290 for merging media units. The media unit manager may merge media units to recover storage space, to defragment storage space, or when a VLUN is deleted, etc.

In step 290a, a media unit 292a is sliced into three slice media units 294a, 294b and 294c. The slice media unit 294a is exported to a VLUN 296a, and the slice media unit 294b is exported to a VLUN 296b. The slice media unit 294c is unused.

In step 290b, the VLUN 296b is deleted. The slice media unit 294b disappears, and the media unit 292a has only two slices 294a and 294c.

In step 290c, the VLUN 296a is deleted. All the slice media units disappear, and the media unit 292a is unused.

A noteworthy feature of an embodiment of the present invention is the hierarchical nature of media units. Essentially, media units 130 provide a mapping between PLUNs and VLUNs. For example, in FIG. 9 three hierarchies of media units map a VLUN to the PLUNs that store the data in the virtual storage space represented by the VLUN. The first level of the hierarchy is the physical media units which are directly mapped to the PLUNs.

The second level of the hierarchy is the various types of media units that can be built from the first level media units. For example, in FIG. 9 the second-level media units are the four slice media units 130h, 130i, 130j and 130k. The second-level media units are indirectly mapped to the PLUNs by the first-level media units.

The third level of the hierarchy is the various types of media units that can be built using at least one of the second-level media units. For example, in FIG. 9 the third-level media unit is the concatenation media unit 130g. As another example, in FIG. 19 the third-level media unit is the asynchronous mirrored media unit 256. The third-level media units are indirectly mapped to the PLUNs by the first-level and second-level media units.

In conclusion, the embodiments of the present invention use virtual media units as building blocks to create higher-level types of storage, such as slices, concatenations, stripes and mirrors. The use of virtual media units allows building blocks to be created without user intervention or taking parts of the storage area network off-line. This greatly reduces the effort involved in managing a storage area network in the following ways.

First, the embodiments of the present invention allow LUN migration, as shown in FIG. 18 and the associated description. In many existing systems, in order to move data from one PLUN to another, a user may have to take the first PLUN offline, must manually copy the data to the second PLUN, then must bring the second PLUN online. The other users may be unable to read or write data to either PLUN until such process has been completed. The storage server 100 according to an embodiment of the present invention bypasses these inconveniences.

Second, the embodiments of the present invention allow on-the-fly redundancy, as shown in FIG. 17 and the associated description. For example, if a host computer is currently provided 100 GB of storage at a certain reliability level, that reliability can be increased by adding another lower-level member to the higher-level media unit. The storage server 100 according to an embodiment of the present invention enables this to be performed conveniently and transparently to the various end users and host computers.

Third, the embodiments of the present invention allow on-the-fly snapshots, as shown in FIG. 16 and the associated description. In many existing systems, the storage devices must be taken offline to make a snapshot, making them unavailable to the end users and host computers. The storage server 100 according to an embodiment of the present invention bypasses these inconveniences.

Fourth, the embodiments of the present invention allow changing the attributes of media units. For media units in the virtual pool, the media unit manager can change them between RAID, non-RAID, sliced, striped and concatenated, etc. This may be done by simply building a new media unit with the desired attributes that uses the existing media units as building blocks.

Fifth, the embodiments of the present invention allow for easy port migration. For example, if a storage device is to be moved and connected to another port, the host computers each do not have to be made aware of the move. Thus, the storage server 100 according to an embodiment of the present invention greatly simplifies the burden on the SAN administrators.

Sixth, the embodiments of the present invention allow instant snapshots of data, as shown in FIG. 16 and the associated description. For example, for data stored in a mirrored media unit with three physical storage device members, an instant snapshot of the data can be obtained merely by breaking off one of the three legs of the mirrored media unit.

Although many of the features of the present invention have been described as process steps, embodiments of the present invention implement these process steps using one or more of hardware, software, firmware and microcode in the storage server 100. Furthermore, the storage server 100 has embodiments that include one or more of subparts, subcomponents, subprocessors and subroutines (e.g., the media unit manager 120) that implement these process steps or portions thereof.

Although the above description has focused on specific embodiments, numerous variations and their equivalents are considered to be within the scope of the present invention, which is defined by the following claims. When the claims discuss process or method steps, the steps are intended to be performed in any order or simultaneously except where specifically noted.

What is claimed is:

1. A method of operating a storage server that connects a plurality of host computers and a plurality of storage devices, said plurality of storage devices having associated therewith a plurality of physical logical unit numbers (PLUNs), said method comprising:

mapping said plurality of PLUNs to a plurality of first media units;

creating a second media unit from at least a portion of one or more of said plurality of first media units to facilitate abstract block-storage addressing of storage associated with the plurality of PLUNs;

mapping the second media unit to a virtual logical unit number (VLUN) which a host can reference to access data stored in one or more of the storage devices, wherein the plurality of PLUNs are a first storage virtualization level in a storage virtualization hierarchy, the VLUN is a second storage virtualization level in the storage virtualization hierarchy, the plurality of first media units are a third storage virtualization level logically between the first storage virtualization layer and the second storage virtualization layer in the storage virtualization hierarchy, and the second media unit is a fourth storage virtualization level logically between the second storage virtualization layer and the third storage virtualization layer in the storage virtualization hierarchy; and creating storage constructs between the plurality of first media units and the second media unit using the abstract block-storage addressing as a source of blocks that fulfill requirements from the plurality of host computers for predetermined storage attributes and properties at the second storage virtualization level having persistent information stored on the second media unit to describe and store predetermined storage attributes and properties associated with the storage at the second storage virtualization level.

2. The method of claim 1, fUrther comprising:
using said second media unit when transferring data between said plurality of host computers and said plurality of storage devices.

3. The method of claim 1, wherein said plurality of PLUNs are directly mapped to said plurality of first media units.

4. The method of claim 1, wherein said plurality of PLUNs are indirectly mapped to said plurality of first media units.

5. The method of claim 1, wherein said second media unit is at least one of a slice media unit a concatenation media unit, a striped media unit, or a mirrored media unit.

6. The method of claim 1, wherein said plurality of first media units comprises a plurality of physical media units.

7. The method of claim 1, wherein said plurality of first media units includes at least one of a physical media unit, a slice media unit, a concatenation media unit, a striped media unit, or a mirrored media unit.

8. The method of claim 1, wherein said second media unit is an asynchronous mirrored media unit.

9. The method of claim 1, ftwther comprising:
creating a third media unit from at least a portion of another one or more of said plurality of first media units; and
creating a fourth media unit from said second media unit and said third media unit.

10. The method of claim 9, wherein said second media unit is a first slice media unit, said third media unit is a second slice media unit, and said fourth media unit is a concatenation media unit.

11. The method of claim 9, wherein said second media unit is a first mirrored media unit, said third media unit is a second mirrored media unit, and said fourth media unit is a slice media unit.

12. The method of claim 9, wherein said second media unit is a first slice media unit, said third media unit is a second slice media unit, and said fourth media unit is a mirrored media unit.

13. The method of claim 9, wherein said second media unit is a first synchronous mirrored media unit, said third media unit is a second synchronous mirrored media unit, and said fourth media unit is an asynchronous mirrored media unit.

14. The method of claim 1, wherein said portion of said one or more of said plurality of first media units is a second portion of one of said plurality of first media units, and said second media unit is a slice media unit.

15. The method of claim 1, wherein said portion of said one or more of said plurality of first media units is all of two or more of said plurality of first media units, and said second media unit is a mirrored media unit.

16. The method of claim 1, wherein said plurality of first media units is two or more first media units, wherein said second media unit is a mirrored media unit, and wherein said method further comprises:
disassociating one of said two or more first media units from said mirrored media unit; and creating a third media unit from the disassociated first media unit, wherein said third media unit comprises a snapshot of said mirrored media unit.

17. The method of claim 16, wherein said method further comprises:
re-associating the disassociated first media unit with said mirrored media unit, after said third media unit is created.

18. The method of claim 1, wherein said method further comprises:
adding a third media unit associated with another of said plurality of PLUNs;
associating said third media unit with said second media unit, wherein said second media unit is a mirrored media unit; and
reconstructing data of said second media unit on said another of said plurality of PLUNs via said third media unit.

19. The method of claim 18, wherein said third media unit is associated with said second media unit to provide a greater level of redundancy.

20. The method of claim 18, wherein said third media unit is associated with said second media unit to replace a failed media unit.

21. The method of claim 1, wherein said portion of one or more of said plurality of first media units comprises a first media unit associated with a first PLUN of said plurality of PLUNs, and wherein said method flirther comprises:
adding a third media unit associated with at least a portion of a second PLUN of said plurality of PLUNs;
associating said third media unit with said second media unit, wherein said second media unit is a mirrored media unit;
reconstructing data of said second media unit on said second PLUN via said third media unit; and
disassociating said third media unit from said second media unit.

22. The method of claim 1, wherein said second media unit is asynchronous mirrored media unit, and wherein said method further comprises:
creating a third media unit from said second media unit and another of said plurality of first media units, wherein said third media unit is an asynchronous mirrored media unit.

23. The method of claim 1, wherein said method is performed in a distributed manner by a plurality of processors.

24. The method of claim 1, wherein said method further comprises:
exporting a first designated media unit of said plurality of first media units to a first virtual LUN;

reconstructing a second designated media unit of said plurality of first media units using said second media unit, wherein said second media unit is a mirrored snapshot media unit;
exporting said second media unit to a second virtual LUN; and associating a third media unit with said first designated media unit, said first virtual LUN and said second media unit.

25. The method of claim 24, wherein said method further comprises:
creating a fourth media unit from at least a portion of one or more of said plurality of first media units, wherein said fourth media unit is a second mirrored snapshot media unit;
associating said third media unit with said first designated media unit, said first virtual LUN, said second media unit and said fourth media unit;
reconstructing a third designated media unit of said plurality of first media units using said fourth media unit; and
exporting said fourth media unit to a third virtual LUN.

26. The method of claim 24, further comprising, after completion of reconstructing said second designated media unit:
exporting said first designated media unit directly to said first virtual LUN; and
exporting said second designated media unit directly to said second virtual LUN.

27. The method of claim 1, wherein said method further comprises:
exporting a first designated media unit of said plurality of first media units to a first virtual LUN;
creating a second designated media unit of said plurality of first media units, wherein said second designated media unit is smaller than said first designated media unit;
associating said second media unit with said first designated media unit and said second designated media unit, wherein said second media unit is a snapshot media unit;
exporting said second media unit to a second virtual LUN;
creating a third media unit and exporting said third media unit to said first virtual LUN, wherein said third media unit is associated with said first designated media unit and said second media unit; and
creating a fourth media unit and exporting said fourth media unit to a third virtual LUN, wherein said fourth media unit is a second snapshot media unit, and wherein said fourth media unit is associated with said second media unit and a third designated media unit of said plurality of first media units.

28. The method of claim 1, wherein said second media unit is one of a plurality of slice media units associated with one of said plurality of first media units, wherein said method further comprises:
deleting a first virtual LUN associated with a third media unit of said plurality of slice media units, and in response thereto deleting said third media unit; and
deleting a second virtual LUN associated with said second media unit, and in response thereto deleting said second media unit.

29. A storage server comprising:
a physical logical unit number (PLUN) manager to manage data and command transfer to a plurality of storage devices, the plurality of storage devices having a plurality of PLUNs associated therewith;
a virtual logical unit number (VLUN) manager to manage data and command transfer to a plurality of hosts, including to export a plurality of VLUNs to the plurality of hosts such that the hosts can reference the VLUNs to access data stored in the plurality of storage devices; and
a media unit manager to map the PLUNs to the VLUNs by creating a storage virtualization hierarchy including a plurality of levels of virtual media units, wherein the PLUNs are a first storage virtualization level in the storage virtualization hierarchy and the VLUNs are a second storage virtualization level in the storage virtualization hierarchy, the media unit manager to map the plurality of PLUNs to a plurality of first media units and to create a second media unit from at least a portion of one or more of the plurality of first media units making abstract block-storage addressing of storage associated with the plurality of PLUNs available, the second media unit being mapped to a VLUN to export the second media unit to a host, wherein the plurality of first media units are a third storage virtualization level logically between the first storage virtualization level and the second storage virtualization level in the storage virtualization hierarchy and the second media unit is a fourth storage virtualization level logically between the second storage virtualization level and the third storage virtualization level in said storage virtualization hierarchy and creating storage constructs between the plurality of first media units and the second media unit using the abstract block-storage addressing as a source of blocks that fulfill requirements from the plurality of hosts for predetermined storage attributes and properties at the second storage virtualization level having persistent information stored on the second media unit to describe and store predetermined storage attributes and properties associated with the storage at the second storage virtualization level.

30. The storage server of claim 29, wherein said plurality of PLUNs are directly mapped to said plurality of first media units.

31. The storage server of claim 29, wherein said plurality of PLUNs are indirectly mapped to said plurality of first media units.

32. The storage server of claim 29, wherein said second media unit is at least one of a slice media unit, a concatenation media unit, a striped media unit or a mirrored media unit.

33. The storage server of claim 32, wherein said plurality of first media units includes at least one of a physical media unit, a slice media unit, a concatenation media unit a striped media unit, or a mirrored media unit.

34. The storage server of claim 29, wherein said second media unit is an asynchronous mirrored media unit.

35. The storage server of claim 29, wherein the media unit manager further is to:
create a third media unit from at least a portion of another one or more of said plurality of first media units; and
create a fourth media unit from said second media unit and said third media unit.

36. A storage server comprising:
a first interface through which to communicate with a plurality of external host computers;
a second interface through which to communicate with a plurality of external storage devices, said plurality of external storage devices having associated therewith a plurality of physical logical unit numbers (PLUNs);
a processor set comprising at least one processor; and
computer program code executable by the processor set to cause the storage server to execute steps comprising:
mapping said plurality ot PLUNS to a plurality ot tirst media units;

creating a second media unit from at least a portion of one or more of said plurality of first media units to facilitate abstract block-storage addressing of storage associated with the plurality of PLUNs; and exporting the second media unit to a host by mapping the second media unit to a virtual logical unit number (VLUN) which said host can reference to access data stored in one or more of the plurality of external storage devices, wherein the plurality of PLUNs are a first storage virtualization level in a storage virtualization hierarchy, the VLUN is a second storage virtualization level in the storage virtualization hierarchy, the plurality of first media units are a third storage virtualization level logically between the plurality of PLUNs and the VLUN first storage virtualization level and the second storage virtualization level in the storage virtualization hierarchy, and the second media unit is a fourth storage virtualization level logically between the second storage virtualization level and the third storage virtualization level in the storage virtualization hierarchy; and creating storage constructs between the plurality of first media units and the second media unit using the abstract block-storage addressing as a source of blocks that fulfill requirements from the plurality of external host computers for predetermined storage attributes and properties at the second storage virtualization level having persistent information stored on the second media unit to describe and store predetermined storage attributes and properties associated with the storage at the second storage virtualization level.

37. The storage server of claim 36, wherein said second media unit is formed from each of said plurality of first media units in their entireties.

38. The storage server of claim 36, wherein said second media unit is formed from only a portion of each of said plurality of first media units.

39. The storage server of claim 36, wherein said second media unit is a mirrored media unit.

40. The storage server of claim 36, further comprising computer program code executable by the processor set to cause the storage server to execute steps comprising:

creating a third media unit from at least a portion of another one or more of said plurality of first media units; and creating a fourth media unit from said second media unit and said third media unit.

41. A method of operating a storage system, the method comprising:

maintaining a plurality of physical logical unit numbers (PLUNs) that are mapped to a set of one or more physical storage devices;

maintaining a virtual logical unit number (VLUN) that is exportable to an external host;

maintaining a storage virtualization hierarchy that includes the plurality of PLUNs as a first storage virtualization level in the storage virtualization hierarchy, the VLUN at as a second storage virtualization level in the storage virtualization hierarchy, and a plurality of additional storage virtualization levels defined logically between the first storage virtual ization level and the second storage virtualization level in the storage virtualization hierarchy, each of the plurality of additional storage virtualization levels including at least one media unit to facilitate abstract block-storage addressing of storage associated with the plurality of PLUNs; and creating storage constructs between a plurality of first media units and a second media unit using the abstract block-storage addressing as a source of blocks that fulfill requirements from a plurality of hosts for predetermined storage attributes and properties at the second storage virtualization level having persistent information stored on the second media unit to describe and store predetermined storage attributes and properties associated with the storage at the second storage virtualization level.

* * * * *